United States Patent [19]
Nakatsuka et al.

[11] Patent Number: 6,125,204
[45] Date of Patent: *Sep. 26, 2000

[54] JUDGING A LOGICAL RELATION BETWEEN A PLURALITY OF AREAS BASED UPON THE PHYSICAL RELATION THEREBETWEEN

[75] Inventors: Tadanori Nakatsuka, Machida; Toru Niki, Yokohama; Kazuyuki Saito, Machida; Akihiro Matsumoto, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/742,222

[22] Filed: Oct. 23, 1996

Related U.S. Application Data

[63] Continuation of application No. 08/175,751, Dec. 30, 1993, abandoned.

[30] Foreign Application Priority Data

Jan. 11, 1993 [JP] Japan ................................ 5-002696
Jan. 18, 1993 [JP] Japan ................................ 5-006034

[51] Int. Cl.[7] .................................................. G06K 9/34
[52] U.S. Cl. ........................ 382/173; 382/176; 382/180; 382/193
[58] Field of Search ................................ 382/173, 174, 382/176, 190, 193, 200, 202, 206, 282, 232, 180, 229

[56] References Cited

U.S. PATENT DOCUMENTS

| | | | |
|---|---|---|---|
| 4,398,177 | 8/1983 | Bernhardt | 382/193 |
| 4,907,283 | 3/1990 | Tanaka et al. | 382/40 |
| 5,048,099 | 9/1991 | Lee | 382/282 |
| 5,068,907 | 11/1991 | Takeo | 382/282 |
| 5,123,062 | 6/1992 | Sangu | 382/282 |
| 5,185,813 | 2/1993 | Tsujimoto | 382/9 |
| 5,204,915 | 4/1993 | Nishida | 382/21 |
| 5,231,663 | 7/1993 | Earl et al. | 380/18 |
| 5,245,674 | 9/1993 | Cass et al. | 382/16 |
| 5,317,649 | 5/1994 | Nishida | 382/202 |
| 5,321,770 | 6/1994 | Huttenlocher et al. | 382/22 |
| 5,335,290 | 8/1994 | Cullen et al. | 382/9 |
| 5,384,864 | 1/1995 | Spitz | 382/9 |
| 5,583,955 | 12/1996 | Yamada | 382/282 |

OTHER PUBLICATIONS

Pattern Recognition., vol. 23, No. 11, Nov. 1990, Oxford, GB pp. 1141–1154, XP000160004, T. Akiyama & N. Hagita 'automated entry system for printed documents' *chapters 3, 5*.

9th International Conference on Pattern Recognition, Nov. 1988, Rome IT pp. 425–429, XP000013013, K. Kise et al. 'Visiting Card Understanding System', *p. 426, right column, paragraph 3; figure 4 *.

10th International Conference on Pattern Recognition, Jun. 1990, Atlantic City, USA, pp. 551–556, XP000166354, S. Tsujimoto & H. Asada 'Understanding Multi–articled Documents'.

*Primary Examiner*—Matthew C. Bella
*Attorney, Agent, or Firm*—Fitzpatrick, Cella, Harper & Scinto

[57] ABSTRACT

Image processing method and apparatus are provided. Image information is inputted. The input image information is divided into a plurality of areas. Radial line segments are extended in upper, lower, left, and right directions from a point in an arbitrary notice area in the divided areas and connection information between the line segments and the input image is detected. Characteristics of the notice area are discriminated in accordance with the connection information detected. The connection information of the areas is a relative position of each area. The image information is dot information. The characteristics to be discriminated are such that the image information of the area is a headline.

11 Claims, 37 Drawing Sheets

| RECTANGLE DATA |
| --- |
| RECTANGLE LABEL |
| INITIAL POINT COORDINATE |
| TERMINAL POINT COORDINATE |
| PIXEL LABEL |
| NO. OF PIXELS |

| RECTANGLE LABEL | ATTRIBUTES |
| --- | --- |
| POSITIVE INTEGERS | BODY |
| 0 | INVALID |
| -1 | NOT USED |
| -2 | NOT USED |
| -3 | SEPARATOR |
| -4 | TABLE |
| -5 | FIGURE, PHOTOGRAPH |

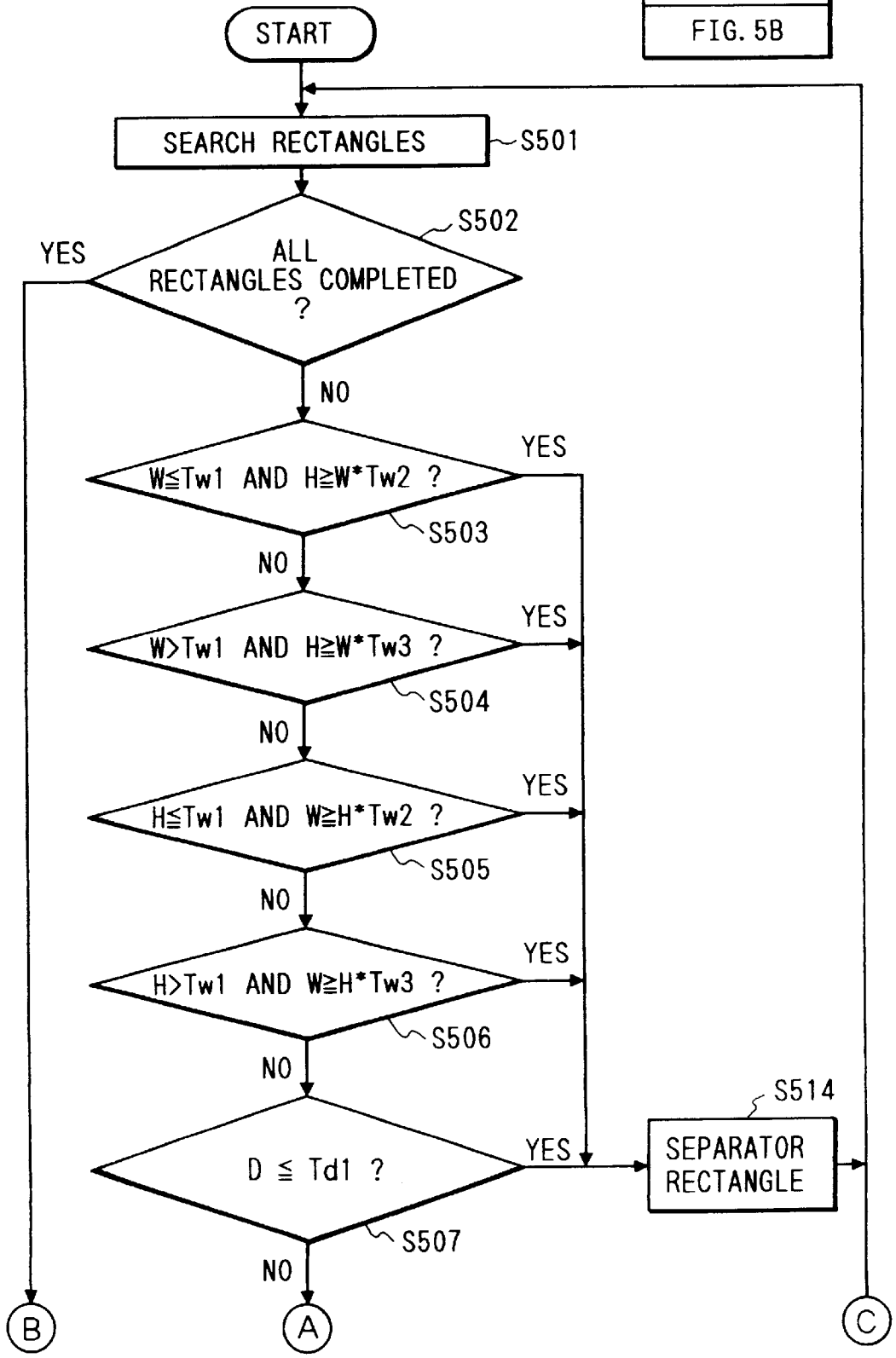

(*) FIGURE OR PHOTOGRAPH
IF W≧Tw4 AND H≧Tw4 AND D≧Td5

FIG. 43
外部記憶装置の知識
パソコンやワープロで作成したデータを蓄え、
とのできる装置が外部記憶装置です。コンピュータ

461

JUDGING A LOGICAL RELATION BETWEEN A PLURALITY OF AREAS BASED UPON THE PHYSICAL RELATION THEREBETWEEN

This application is a continuation of application Ser. No. 08/175,751 filed Dec. 30, 1993, now abandoned.

BACKGROUND OF THE INVENTION

1. Field of the Invention

The invention relates to image processing method and apparatus for reading a document image and identifying position and attributes of the document.

2. Related Background Art

A flow of processes of a conventional optical character recognizing apparatus will now be described in accordance with a flowchart of FIG. 47. In step S4701, an image is read by a scanner and image information is converted into a binary electric signal. The read data is displayed by a display in step S4702. In step S4703, the operator sets a recognition target area as a rectangle of arbitrary size and position by using a pointing device. Since a vertical type-setting document and a horizontal type-setting document exist in Japanese documents, it is necessary to decide an attribute regarding the vertical or horizontal type-setting, namely, type-setting direction before a character extracting process is executed. Therefore, the type-setting direction is deduced for such an area in step S4704. A character extracting process for extracting a character image every character in accordance with the result of the deduction in step S4705. A recognizing process is executed in step S4706. The recognition result is displayed on a display in step S4707 and is edited or preserved in accordance with an instruction of the operator.

There is also a case where it is very difficult to deduce the type-setting direction in dependence on an input document and it is erroneously deduced in step S4704. In the above conventional example, however, there is no means for confirming and correcting by the operator in the case where the type-setting direction was erroneously deduced, so that there is a drawback such that the process is continued in the wrong type-setting direction causing an incorrect recognition result.

Hitherto, there is an apparatus such that in the case where image information is a document having a complicated construction such that a column setting was performed or a plurality of headlines are arranged at random, the operator divides the position of the document into a plurality of rectangles and designates them and also designates the order of each rectangle or the relation with the headline thereof as attributes of the rectangle.

Hitherto, as a method of dividing the area of a table from the image data of a document in which a plurality of kinds of data such as body, photograph, table, and the like mixedly exist, a method of obtaining from a ratio between the area of such an area and the number of pixels is used.

However, the above conventional technique for ordering the headlines has a problem such that in case of an original such as a newspaper article or the like in which a headline exists so as to be surrounded by the body, the headline enters the body and is recognized and disturbs a flow of sentences of the body.

The above conventional technique for the area division has a problem such that in the case where a separator or the like which occurs due to a complicated polygonal line or the like is handled as one area, when the number of pixels for the area of a circumscribed rectangle increases, such an area is erroneously judged as a table area, so that a precision of the area division decreases.

SUMMARY OF THE INVENTION

According to the invention, the result of the deduction of the type-setting direction can be displayed before a recognizing process is started, and the apparatus can easily reverse the type-setting direction in the case where the deduction is wrong, so that there are advantages such that there is no danger such that the process will be continuously performed to the last step incorrectly, allowing the whole operating time to be reduced and providing a better user's interface.

According to the invention, radial line segments are extended from a headline and when a body paragraph exists in either three or more directions of the upper, lower, left, and right directions of the headline, by setting the headline to the order beyond the body paragraph, even in case of a document like a newspaper article or the like such that the headline is surrounded by the body, it can be correctly ordered and a flow of sentences of the body is not disturbed, so that troublesome operation of correction by the user becomes unnecessary and the processing procedure can be simplified and the processing time can be reduced.

According to the invention, by executing processes for dividing an input image into rectangle areas every attribute such as figure, photograph, table, separator, or the like, for extending radial line segments from an arbitrary point in an area which was temporarily judged as a table area, and for identifying that such an area is a table in consideration of the number of intersections with a table frame and the directions of the intersections, there are advantages such that a precision of the table division is raised and a processing load is reduced, and the table division which is strong to the inclination can be executed.

BRIEF DESCRIPTION OF THE DRAWINGS

FIG. 20 is a diagram showing a state of judgment regarding whether a body paragraph exists in the upper, lower, left, or right direction of a notice headline or the like;

FIG. 22 is a diagram showing a state of judgment regarding whether a body paragraph exists in the upper, lower, left, or right direction of the notice headline or the like;

FIG. 43 is a diagram for explaining projection components of a character image;

DETAILED DESCRIPTION OF THE PREFERRED EMBODIMENTS

Embodiment 1

Figure 1:
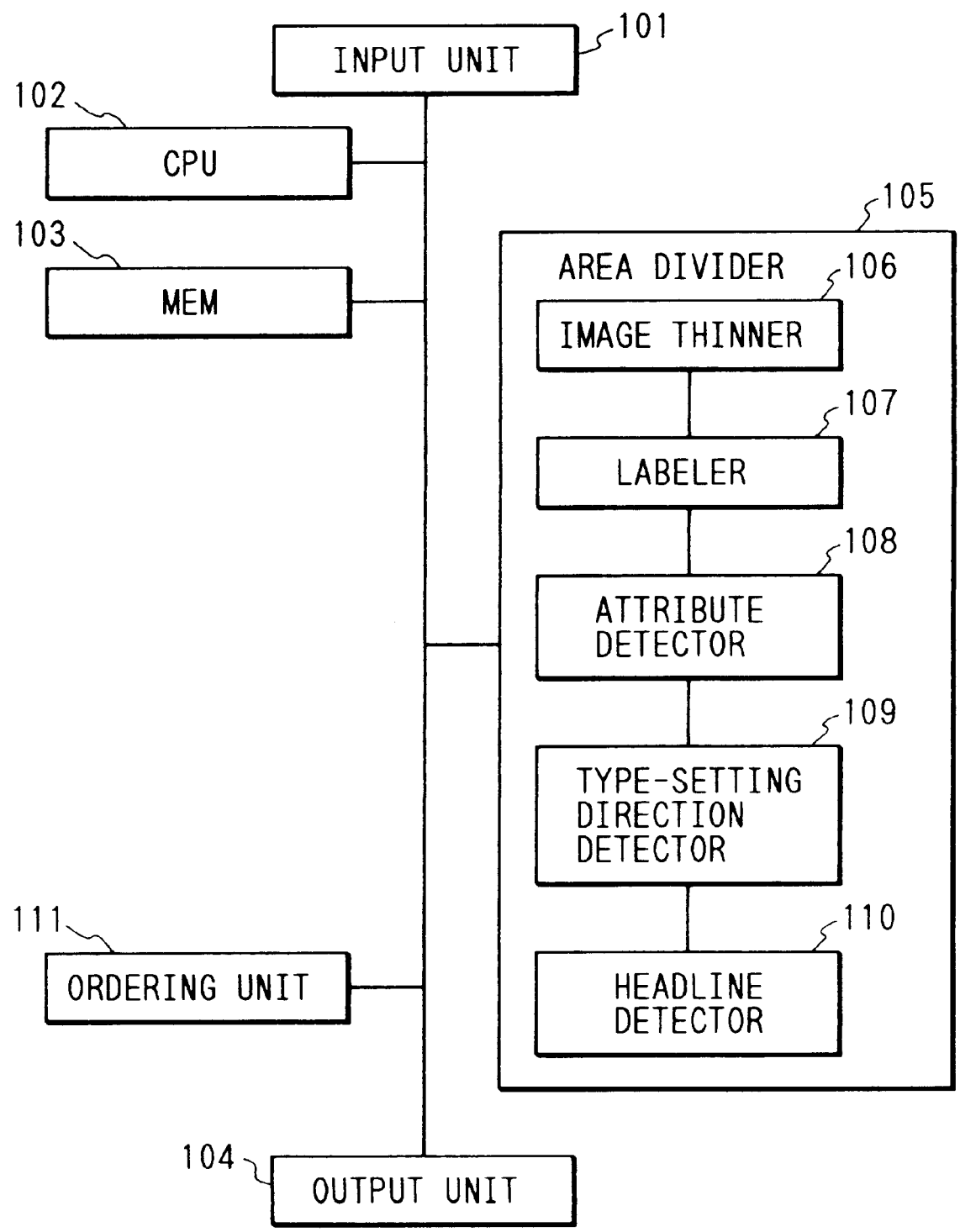
FIG. 1 is a block diagram showing a schematic construction of an image processing apparatus of an embodiment of the invention.

FIG. 1 is a block diagram showing a construction of an image processing apparatus of the embodiment.

In the diagram, reference numeral 101 denotes an input unit of image data for inputting image data which is read by a scanner or image data which is transmitted from a host computer; 102 a central processing unit (CPU) for executing a control of the apparatus in accordance with control programs stored in a memory unit (MEM) 103 and arithmetic operations of a process of each section; and 103 the memory unit for storing the control programs for processes shown in flowcharts, which will be explained hereinlater, and various kinds of data. The memory unit 103 includes an ROM and an RAM. Reference numeral 104 denotes an output unit for outputting the result of the arithmetic operating process, the result of the image process, and the image data; 105 an area divider for executing a whole area dividing process; 106 an image thinner for thinning out the input image; 107 a labeler for labeling pixels which were thinned out and also for making initial rectangle data; 108 an attribute detector for detecting attributes in an area of a separator, table, figure, or the like; 109 a type-setting direction detector for detecting the type-setting direction of sentences indicative of the vertical writing, horizontal writing, or the like; 110 a headline detector for detecting a headline; and 111 an ordering unit for ordering the paragraphs and headlines of sentences.

Figure 2:
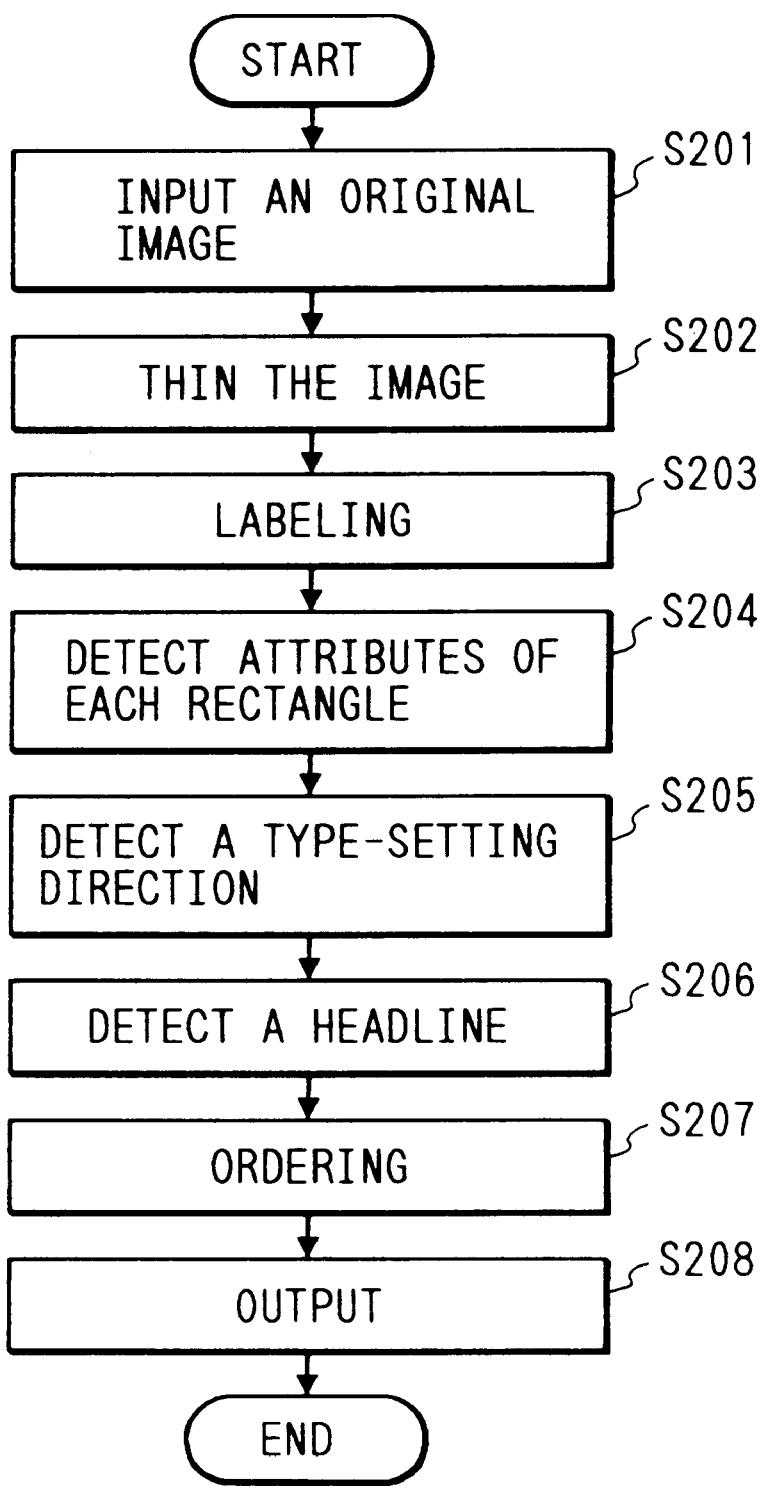
FIG. 2 is a flowchart showing image processes in the image processing apparatus of the embodiment 1.

FIG. 2 is a flowchart showing image processes in the image processing apparatus of the embodiment. A control program to execute the image processes is stored in the memory unit 103 and executed by the CPU 102.

Step S201

An original image is first inputted from the image input unit 101. The image information comprises dots optically read from a scanner (i.e. dot information).

Step S202

In the image thinner 106, subsequently, the logical OR of m dots (in the vertical direction)×n dots (in the horizontal direction) is obtained for the original image and the pixels comprising (m×n) dots are thinned out to a pixel comprising one dot and the image data after completion of the thinning process is stored into the memory unit 103.

Thus, in accordance with the logical OR operation, when a pixel having at least one black dot exists in the (m×n)

pixels in the original image, the thinned image pixel constitutes a black dot.

Step S203

The labeler 107 executes processes for adding labels to the black pixels of the thinned image in the memory unit 103 every row, for adding the same label to the pixels which are continuous in the vertical, horizontal, or oblique direction, and for simultaneously tracing a rectangle.

Figures 3, 4:
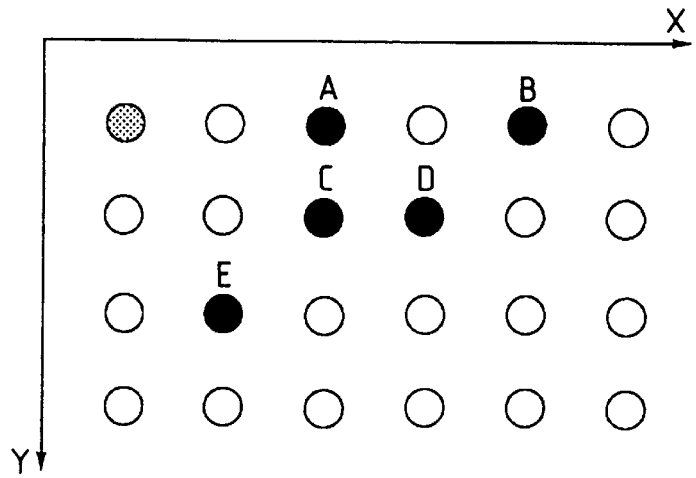
FIG. 3 is a diagram showing an example of a labeling process.
FIG. 4 is a diagram showing a rectangle data structure.

In case of an example shown in FIG. 3, a label 1 is added to a pixel A which is first detected, coordinates (Xa, Ya) of the pixel A are assumed to an initial and terminal points of the rectangle as the label 1, and the number of pixels is set to 1. The same label 1 as that of the pixel is added to a rectangle label for distinguishing a rectangle and the above data is stored as rectangle data (FIG. 4) into the memory unit 103. After the label data of the pixel A was stored, a searching operation for labeling is executed in the X direction. In FIG. 3, since the pixel adjacent to the pixel A is a white pixel, a next black pixel B is labeled.

A label 2 which can be distinguished from the pixel A is added to the pixel B in which pixels which are continuous in the left direction don't exist (since a row which is at present being processed is the first row, there is no pixel that is continuous from the upper position). Coordinates (Xb, Yb) of the pixel B are assumed to initial and terminal points of the rectangle and the number of pixels is set to 1. The same label 2 as that of the pixel is added to the rectangle label for distinguishing the rectangle and the above data is also stored as rectangle data (FIG. 4) into the memory unit 103.

In a manner similar to the above, after completion of the labeling of the first row, the processing routine advances to the second row.

A first black pixel C which is found out by the searching operation for labeling of the second row is continuous with the pixel A of the label 1 from the upper position. Therefore, the same pixel label 1 as that of the pixel A is added to the black pixel C. "1" corresponding to the number of pixels of the pixel C is added to the number of pixels for the rectangle data of the rectangle label 1, so that the total number of pixels is equal to 2 and the rectangle label is held to 1 without being changed. Only the terminal point of the rectangle coordinates is updated from (Xa, Ya) to (Xa, Yc) (the coordinates of the initial point are not changed).

Since a next pixel D is continuous with the pixel C from the left position, the same label 1 as that of the pixel C is added. "1" is added to the number of pixels for the rectangle data of the rectangle label 1, so that the total number of pixels is equal to 3. The rectangle label is held to 1 without being changed. Only the terminal point of the rectangle coordinates is updated from (Xa, Yc) to (Xd, Yc) (the Y coordinate of the terminal point is not changed).

In this instance, the pixel D is also continuous with the pixel B in the oblique direction and is continuous with the pixel C. Therefore, the label of the pixel B is changed from the label 2 to the same label 1 as that of the pixel D. The number of pixels of the rectangle label 2 is added to the number of pixels of the rectangle data of the rectangle label 1, so that the total number of pixels is equal to 4. The rectangle label is held to 1 without being changed. The X and Y coordinates of only the terminal point of the rectangle coordinates are updated from (Xd, Yc) to (Xb, Yd) as maximum values of four points of A to D. With respect to the rectangle data of the rectangle label 2, the rectangle label is set to 0, thereby invalidating.

After the processes of the second row were finished as mentioned above, the processing routine advances to the third row.

Since the first pixel E of the third row is obliquely continuous with the pixel C, the same pixel label 1 as that of the pixel C is added. "1" is added to the number of pixels for the rectangle data of the rectangle label 1, so that the total number of pixels is equal to 5. The rectangle label is held to 1 without being changed. The initial point of the rectangle coordinates is updated from (Xa, Ya) to the minimum value (Xe, Ya) of five points and the terminal point is updated from (Xb, Yd) to the maximum value (Xb, Ye) of five points.

The labeling and the tracing of the rectangle are executed hereinbelow in a manner similar to the above method.

Step S204

In the attribute detector 108, after completion of the labeling and the tracing of the rectangle, the attributes of the rectangles such as rectangle corresponding to the body, rectangle corresponding to the figure, photograph, table, or the like, rectangle corresponding to the separator, and the like are distinguished by using a width W of rectangle, a height H, an area S, and the number of pixels for the area, namely, a pixel density D (those values of W, H, S, and D can be easily obtained by calculating by using the number of pixels of the rectangle data, the initial and terminal points, and the coordinates).

Figure 5B:
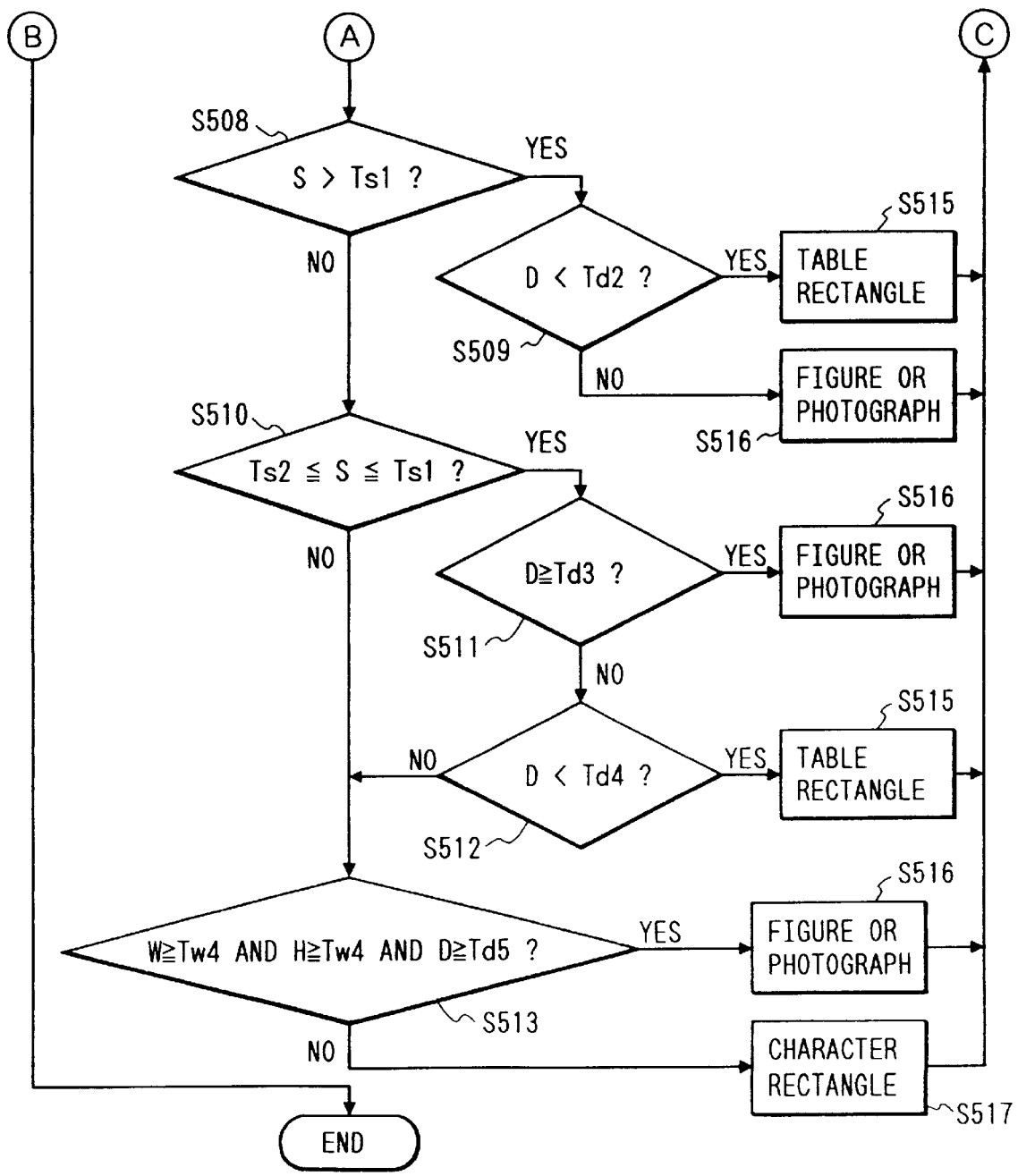
FIG. 5 is comprised of FIGS. 5A and 5B showing flowcharts of an attribute detecting process for detecting attributes of a separator and the like by a size of rectangle.

The process to detect the attributes in step S204 will now be described in detail with reference to a flowchart of FIGS. 5A and 5B.

After the rectangle has been searched (step S502) by the labeling process (step S203), the processing routine advances to processes such that the attributes of each rectangle are judged by using the data stored in the memory unit 103 and the attribute information is set to a rectangle label as shown in FIG. 4 and the data stored in the memory unit 103 is changed. When the width W which is obtained from the coordinates of the initial and terminal points of the rectangle is equal to or less than a threshold value $Tw_1$ and the height H is equal to or larger than a value that is twice as large as a threshold value Tw of the width W (step S503) or when the width W is larger than the threshold value $Tw_1$ and the height H is equal to or larger than a value that is triple as large as the threshold value Tw (step S504), such a rectangle is regarded as a separator which is vertically long and the rectangle label in the rectangle data is changed to −3 and the pixel label constructing the rectangle is held as it is separately from the rectangle label (step S514).

The judgment in which the width and height are exchanged is also executed in a manner similar to the above (steps S505 and S506). The rectangle label of the rectangle data which was judged as a separator which is horizontally long in the above steps is changed to −3.

Figure 6:
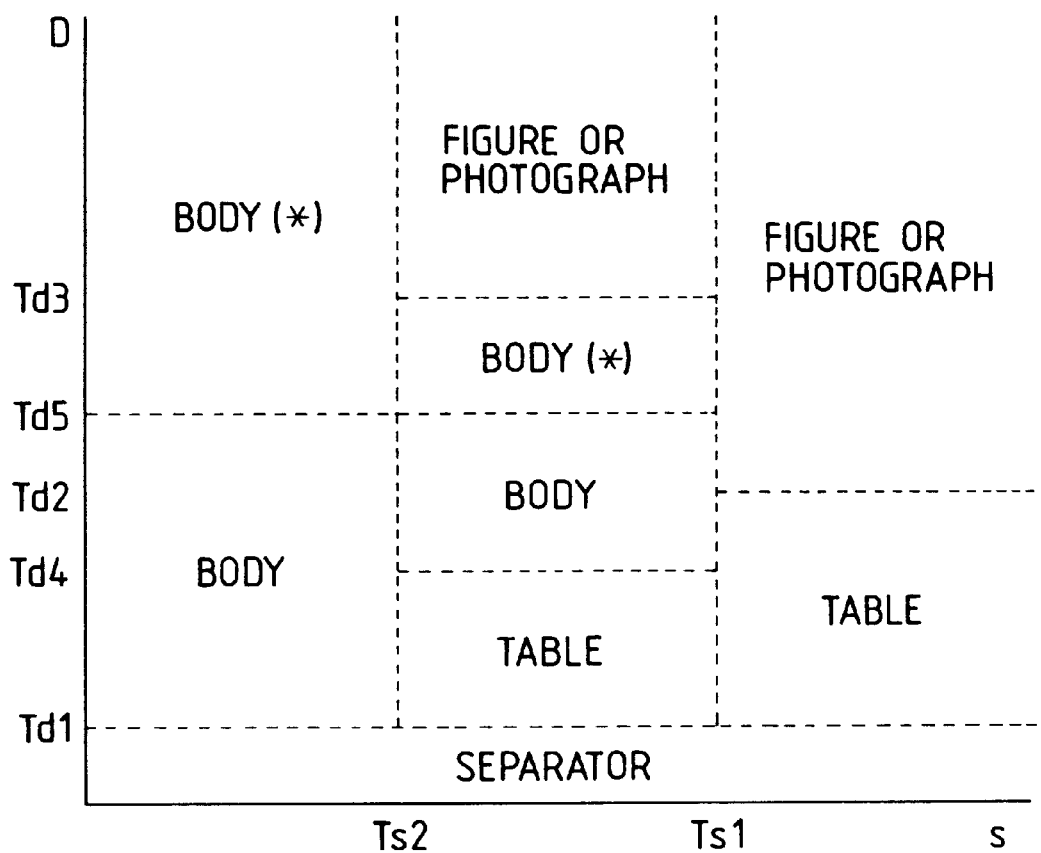
FIG. 6 is a diagram showing the division by a density D and an area S of the attributes of a rectangle (area)

As shown in FIG. 6, the rectangle data in which the pixel density D is equal to or smaller than a threshold value $Td_1$ (step S507) is regarded as a deformed separator such as a hook-shaped separator or the like and the rectangle label is changed to −3 (step S514).

The rectangle data in which the area S is larger than a threshold value $Ts_1$ (step S508) is regarded as a table so long as the pixel data D is less than a threshold value $Td_2$ (step S509 in FIG. 5B), and the rectangle label is changed to −4 (step S515). When the pixel density D is equal to or larger than the threshold value $Td_2$, the rectangle data is regarded as a figure or photograph and the rectangle label is changed to −5 (step S516 in FIG. 5B).

The rectangle in which the pixel density D of the rectangle data in which the area S is equal to or less than the threshold value $Ts_1$ and is equal to or larger than a threshold value $Ts_2$ (step S510) is equal to or larger than a threshold value $Td_3$ (step S511) or the rectangle in which both of the width W and the height H are equal to or larger than a threshold value $Tw_4$ and the pixel density D is equal to or larger than a threshold value $Td_5$ (step S513) is also regarded as a figure or photograph and the rectangle label is changed to −5.

Further, when the area S is equal to or less than the threshold value $Ts_1$ and is equal to or larger than the threshold value $Ts_2$ (step S510), the rectangle in which the pixel density D is less than a threshold value $Td_4$ (step S512) is regarded as a table and the rectangle label is changed to −4 (step S515).

As mentioned above, the rectangle corresponding to the figure, photograph, table, or the like, the rectangle corresponding to the separator, and the like are detected and the remaining rectangles are regarded as bodies and the rectangle label is held to the same pixel label as it is (step S517).

Step S205

The type-setting direction of the body is subsequently detected by the type-setting direction detector 109. In case of horizontally written sentences, the rectangle remaining as a body can easily become a horizontally long rectangle in which the pixels which were thinned out in the horizontal direction. In case of vertically written sentences, the rectangle remaining as a body can easily become a rectangle that is vertically long.

Figure 7:
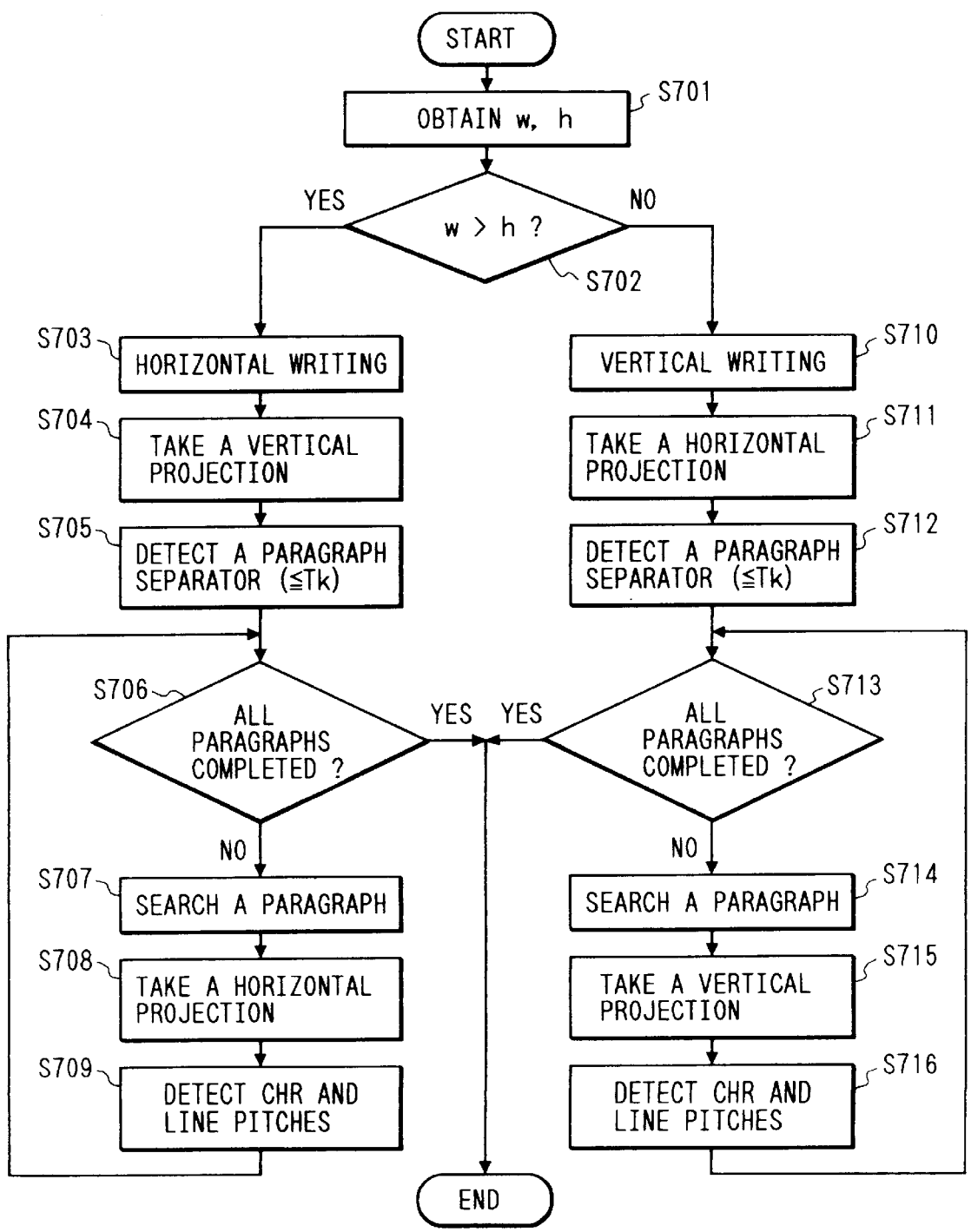
FIG. 7 is a flowchart showing processes of a type-setting direction detector.

Therefore, the average values (w and h) of the width W and height H of the rectangle of the body are calculated (step S701 in FIG. 7). In the case where the average width w is larger than the average height h, the rectangle is regarded as sentences in which the number of horizontally written sentences is large and the average height h is set to a character size of one character (steps S702 and S703 in FIG. 7). On the contrary, in the case where the average height h is larger than the average width w, the rectangle is regarded as sentences in which the number of vertically written sentences is large and the average height h is set to a character size of one character (steps S702 and S710 in FIG. 7).

Figure 8:
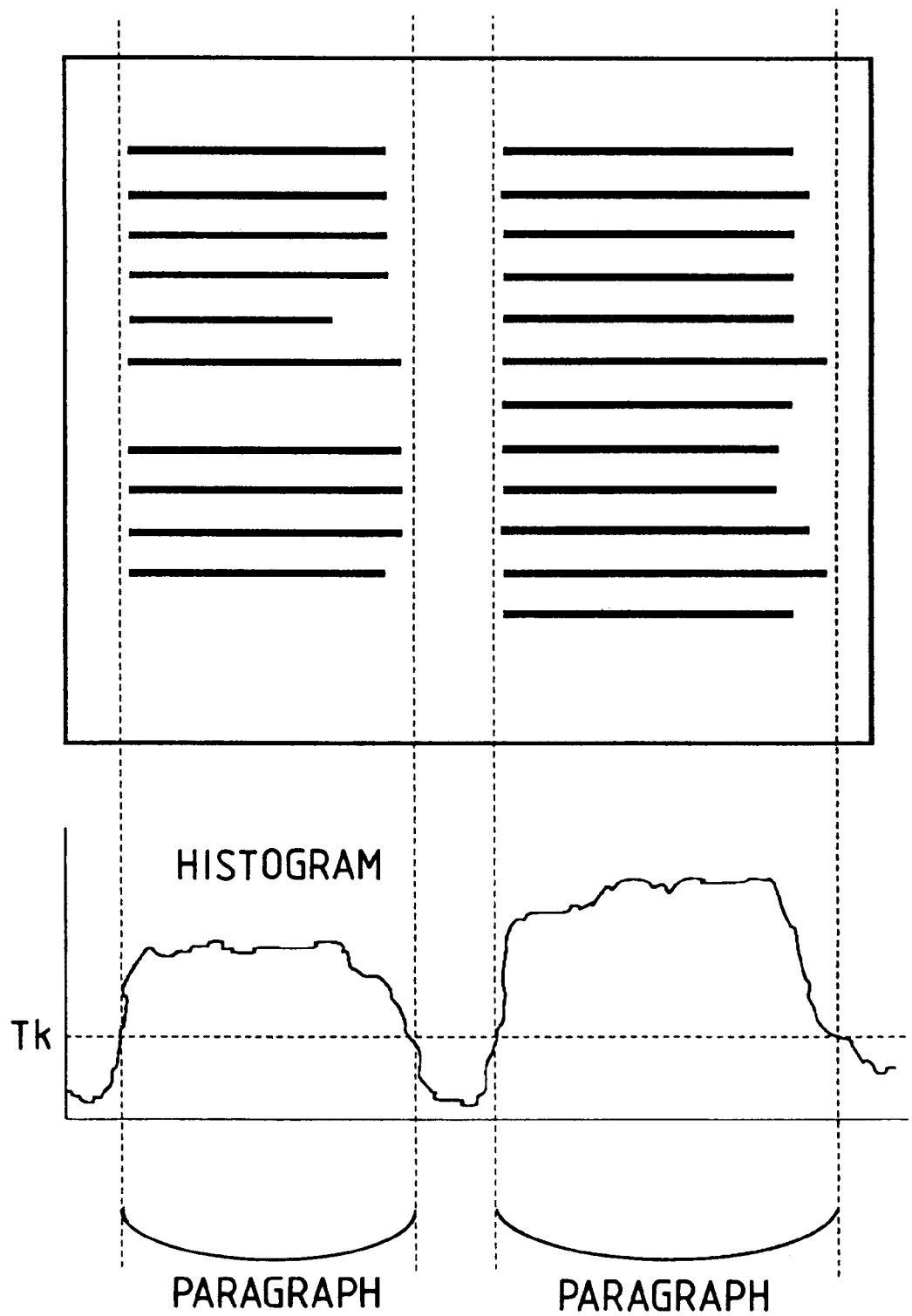
FIG. 8 is a diagram showing an example of a paragraph detecting process.

Subsequently, a histogram of a rectangle is obtained in the direction opposite to the type setting direction (step S704 in FIG. 7). The location in which it is equal to or less than a threshold value Tk from the shape of a peripheral distribution is regarded as a paragraph separator (steps S705 and S712 in FIG. 7). A histogram of the rectangle is obtained in the same direction as the type-setting direction every paragraph (steps S708 and S715 in FIG. 7). The length of continuous black pixels is set to a character size of a character in the paragraph from the shape of the peripheral distribution and the length of continuous white pixels is detected as a line pitch (steps S709 and S716 in FIG. 7 and FIG. 8).

Information to discriminate whether the sentences are the horizontally written sentences or the vertically written sentences is stored into the memory unit 103 together with the rectangle data.

Step S206

Subsequently, the headline detector 110 detects a headline by the type-setting direction and character size.

Figure 9:
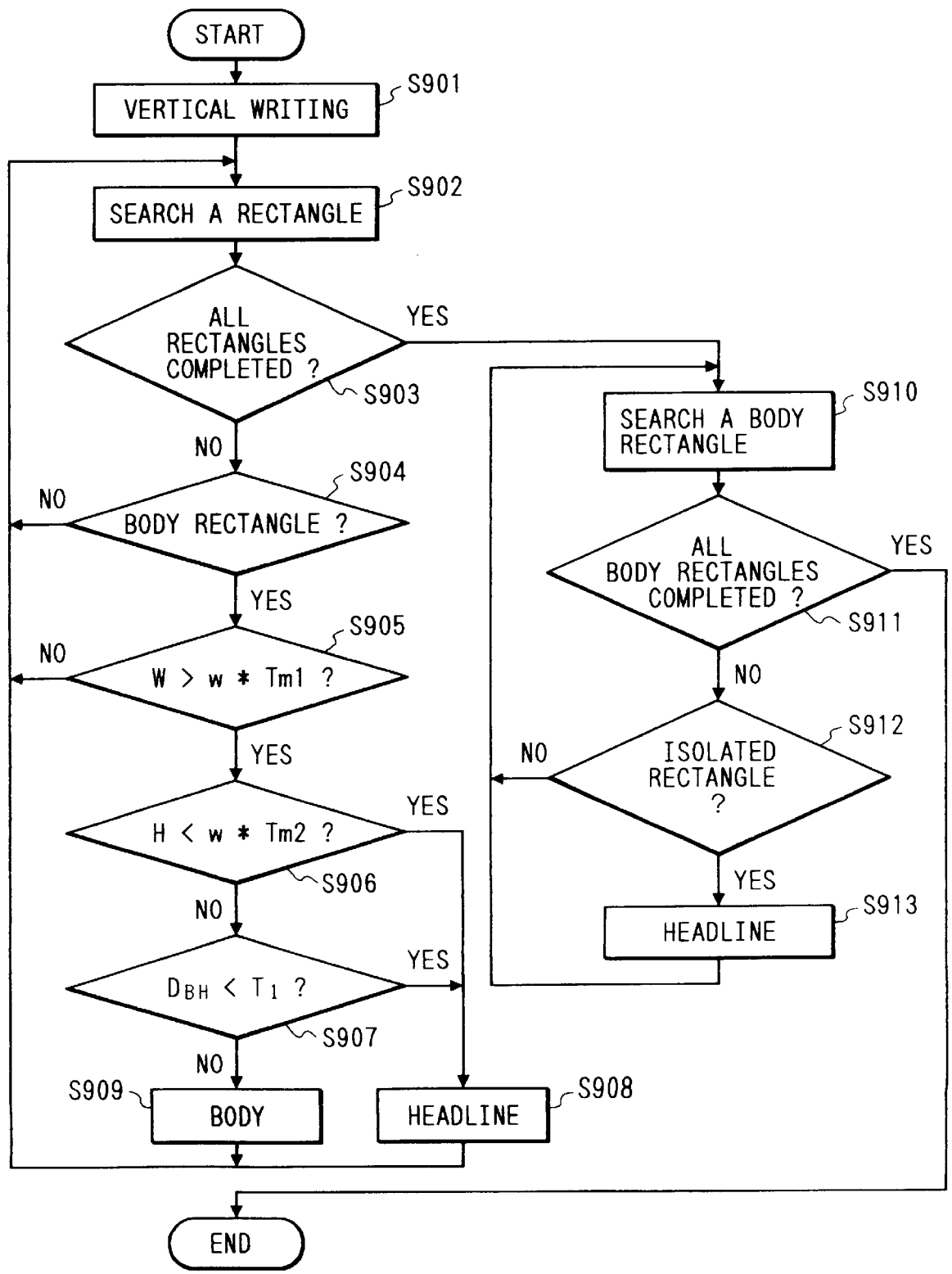
FIG. 9 is a flowchart showing processes of a headline detector.

When considering the case of the vertically written sentences as shown in FIG. 9 as an example, the rectangles in which the width W is larger than the character size w by threshold value $Tm_1$ times or more (namely, W is larger than ($w \times Tm_1$)) are found out from the body rectangles and are detected as candidates of headline rectangles (step S905 in FIG. 9).

Further, when the height H of the rectangle is smaller than a value that is $Tm_2$ times as large as the character size (step S906 in FIG. 9), it is regarded that the horizontally written characters are continuous, so that such a rectangle is set to a headline (step S908 in FIG. 9).

There is a case where a rectangle to which the characters of the body are combined is included in the rectangle which is decided as a headline from the size of rectangle as mentioned above. Therefore, the rectangle in which a distance $D_{BH}$ between the body rectangle and the headline rectangle is shorter than a threshold value $T_1$ (step S907 in FIG. 9) is corrected from the headline to the body (step S909 in FIG. 9).

Further, among the body rectangles which remain by the above processes, the rectangle in which none of the body rectangle and the headline rectangle exists in the range of the character size w is set to a headline as an isolated rectangle (steps S910 to S913 in FIG. 9).

Step S207

The headlines and body paragraphs are subsequently ordered by the ordering unit 111.

Figure 10:
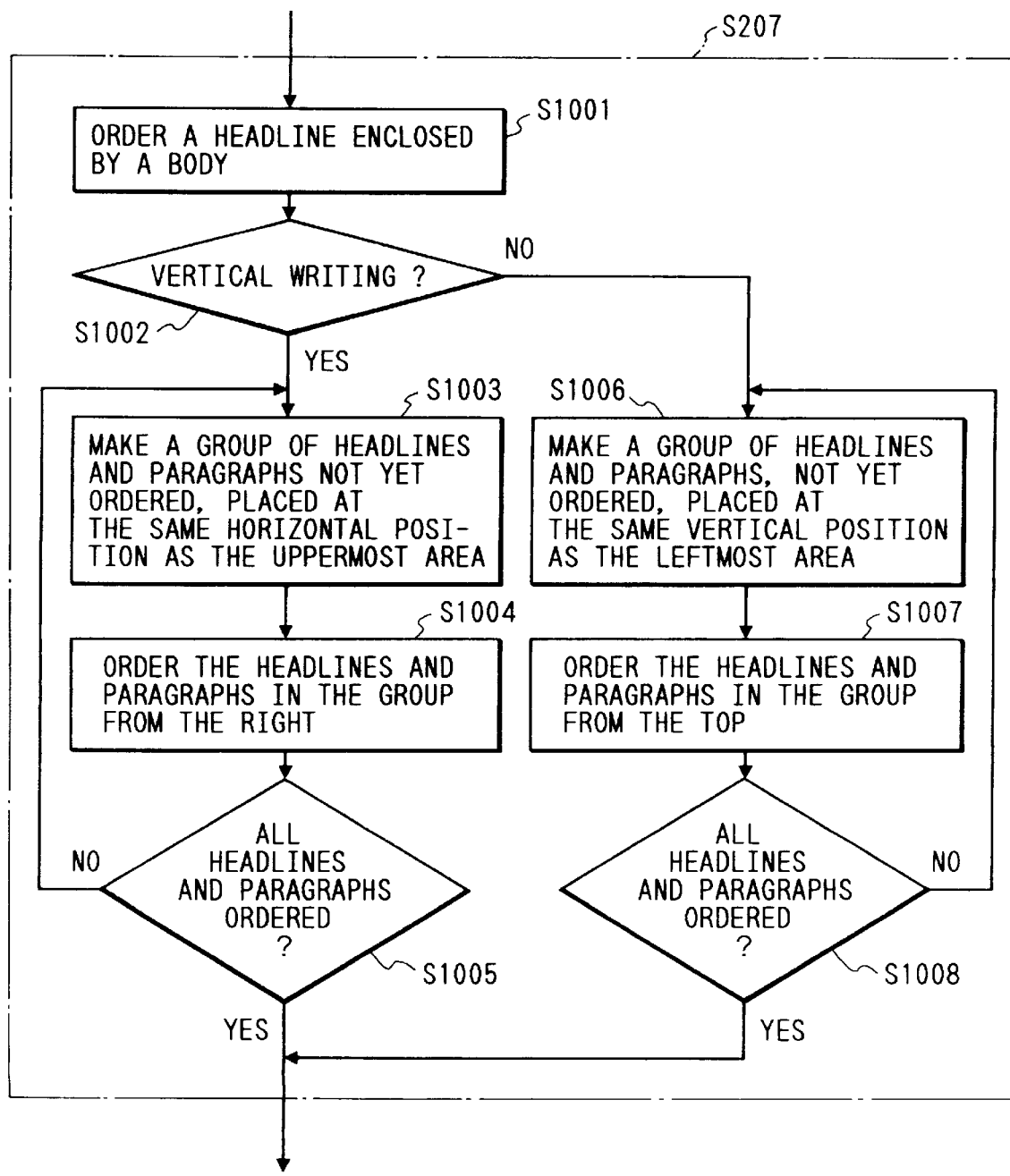
FIG. 10 is a flowchart showing processes of an ordering unit.

The ordering process will now be described in detail hereinbelow. FIG. 10 is a detailed flowchart about step S207. First, a check is made to see if there is a headline enclosed by the body or not. If YES, such a headline is first ordered (step S1001). The process in step S1001 will be explained in detail hereinlater with reference to FIG. 11.

After that, a check is made to see if the sentences are the vertically written sentences or the horizontally written sentences (step S1002) by using the result of the detection of the type-setting direction (step S205) mentioned above. In case of the vertical writing, the headlines and paragraphs locating at almost the same position in the horizontal direction as that of the top area among the headlines and paragraphs which are not yet ordered are collected into the same group (step S1003). When the headlines and paragraphs which belong to the same height are determined, they are sequentially arranged from the right and are ordered (step S1004). After that, when all of the headlines and paragraphs are ordered, step S207 is finished and step S208 follows (step S1005). When there are any other headlines and paragraphs which are not ordered yet, the processing routine is returned to step S1003 and they are ordered in a manner similar to that mentioned above (step S1005).

When it is likewise judged in step S1002 that the writing direction is the horizontal writing, the headlines and paragraphs which are located at almost the same position in the vertical direction as that of the leftmost area among the headlines and paragraphs which are not ordered are collected into the same group (step S1006). When the headlines and paragraphs which belong to the same group are determined, they are sequentially arranged from the top and ordered (step S1007). When all of the headlines and paragraphs are ordered as mentioned above, step S207 is finished and step S208 follows (step S1008). When there are any other headlines and paragraphs which are not yet ordered, the processing routine is returned to step S1006 and they are likewise ordered (step S1008).

Figure 14:
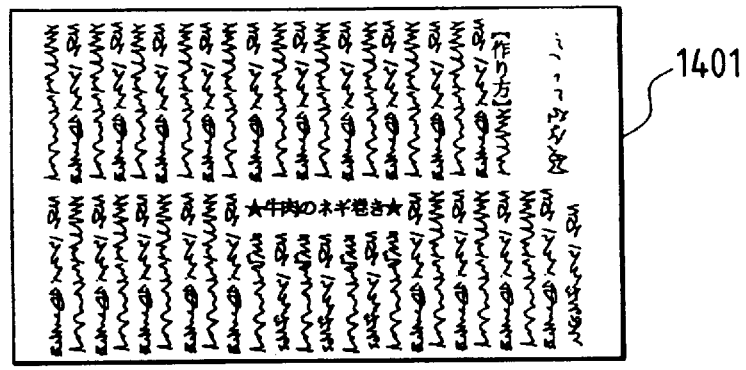
FIG. 14 is a diagram showing an example of an input original.
Figure 15:
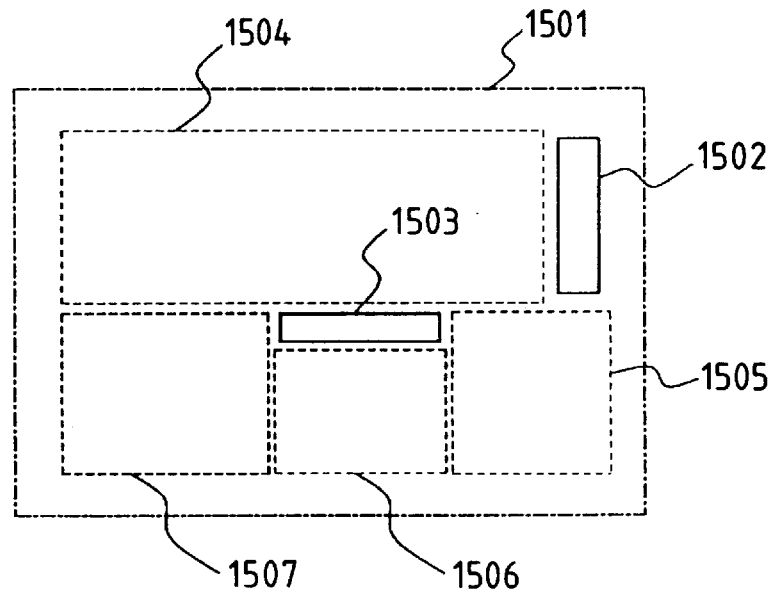
FIG. 15 is a diagram showing headlines and body paragraphs which were extracted by area dividing means.
Figure 16:
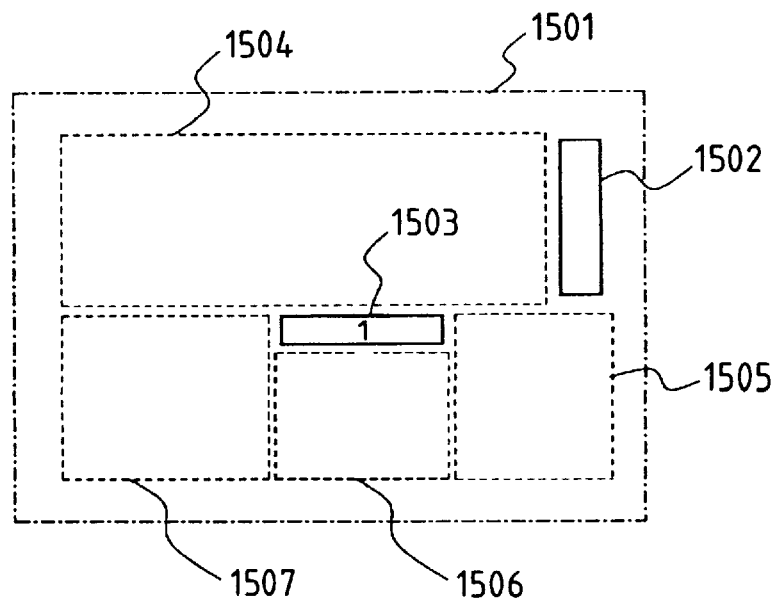
FIG. 16 is a diagram showing a state in which the headline surrounded by the body paragraphs was ordered by the ordering means.

Explanation will now be made by using an embodiment. FIG. 14 shows an input original 1401. FIG. 15 shows headlines and body paragraphs which were taken out from the input original 1401 by the area dividing means (steps S202 to S206) mentioned above. In FIG. 15, reference numeral 1501 denotes a whole state of the headlines and body paragraphs corresponding to the input original 1401. Regions 1502 and 1503 shown by solid lines indicate headlines. Regions 1504 to 1507 shown by broken lines indicate body paragraphs. FIG. 16 shows a state in which it is judged in step S1001 that the headline 1503 is enclosed by the body, so that No. 1 is ordered to the headline 1503. It is also possible to construct in a manner such that the data at each stage in FIGS. 14 to 16 is output from the output unit 104 and is displayed and is confirmed by the operator and the wrong portion is corrected and correct data is again input.

Figure 19:
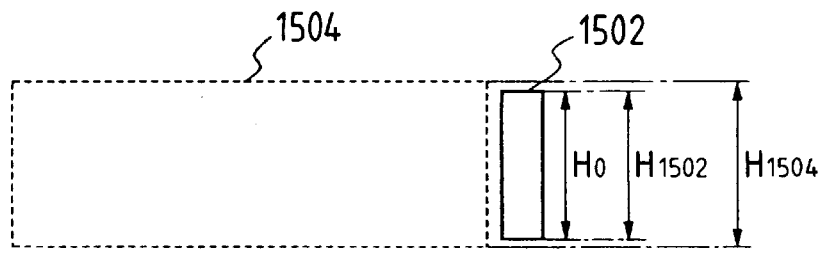
FIG. 19 is a diagram showing an overlap degree of the paragraphs.

When the vertical writing is judged in step S1002, step S1003 follows. In step S1003, the headline or body paragraph locating at the highest position is first fetched from among the headlines and body paragraphs which are not ordered. In FIG. 16, the body paragraph 1504 is located at the highest position. Subsequently, the headlines and body paragraphs which belong to the same group as that of the body paragraph 1504 are taken out. First, a check is made to see if the body paragraph 1504 and the headline 1502 belong to the same group or not. FIG. 19 is a diagram for explaining such a judging process. In FIG. 19, reference numerals H1502 and H1504 denote heights of the headline 1502 and body paragraph 1504, respectively. H0 indicates an overlap in the horizontal direction of the body paragraph 1504 and headline 1502. In the example, H0=H1502. On the basis of those values, the judgment about the same group is executed as follows. When the following relation (length of overlap in the horizontal direction of two areas)/(height of area having a smaller height in the two areas)>(threshold value γ)

is satisfied, it is regarded that the two areas belong to the same group. The threshold value γ lies within a range from 0.0 to 1.0 and is set to γ=0.8 here.

In the example shown in FIG. 19, since $$H0/H1502 > \gamma$$

it is judged that the body paragraph 1504 and headline 1502 belong to the same group. By similarly executing discriminations about the same group with respect to the body paragraph 1504 and the body paragraphs 1505 to 1507, it is known that they don't belong to the same group, so that step S1003 is finished.

Figure 17:
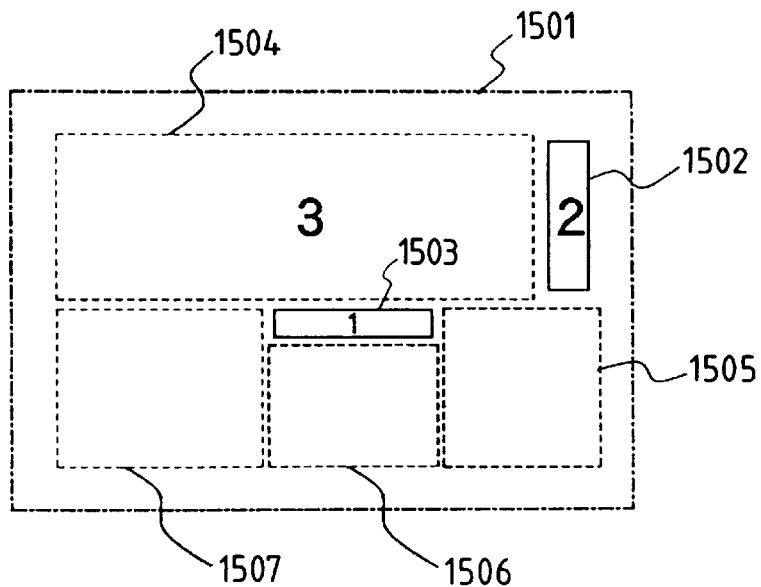
FIG. 17 is a diagram showing a state in which the headlines and a part of the body paragraphs were ordered by the ordering means.

It step S1004, the headline 1502 and the body paragraph 1504 which were judged so that they belong to the same group in step S1003 are sequentially ordered from the right. The points at the right upper corners are compared and No. 2 is ordered to the headline 1502 placed on the rightmost side. No. 3 is subsequently ordered to the body paragraph 1504. The points to be compared are not limited to the points at the right upper corners but centers of gravity or other points can be also used so long as it is possible to judge with respect to which area is located on the right side. FIG. 17 shows a state in which No. 2 is ordered to the headline 1502 and No. 3 is ordered to the body paragraph 1504 sequentially in accordance with the order from the right side in step S1004. Since the body paragraphs 1505 to 1507 are not ordered yet, the processing routine is returned from step S1005 to step S1003 and the processes are continued.

In step S1003, the body paragraphs 1505 to 1507 are set into the same group. In step S1004, No. 4 is ordered to the body paragraph 1505, No. 5 is ordered to the body paragraph 1506, and No. 6 is ordered to the body paragraph 1507 sequentially in accordance with the order from the right side.

Figure 18:
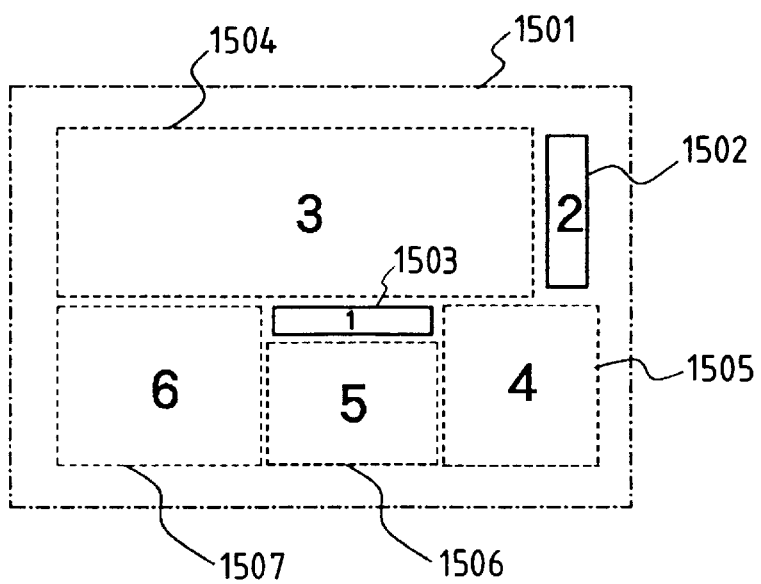
FIG. 18 is a diagram showing a state in which all of the headlines and body paragraphs were ordered by the ordering means.

When all of the headlines and body paragraphs are ordered, the processing routine advances from step S1005 to the next step S208. FIG. 18 shows a state in which step S207 is finished and all of the headlines and body paragraphs have been ordered.

Figure 11:
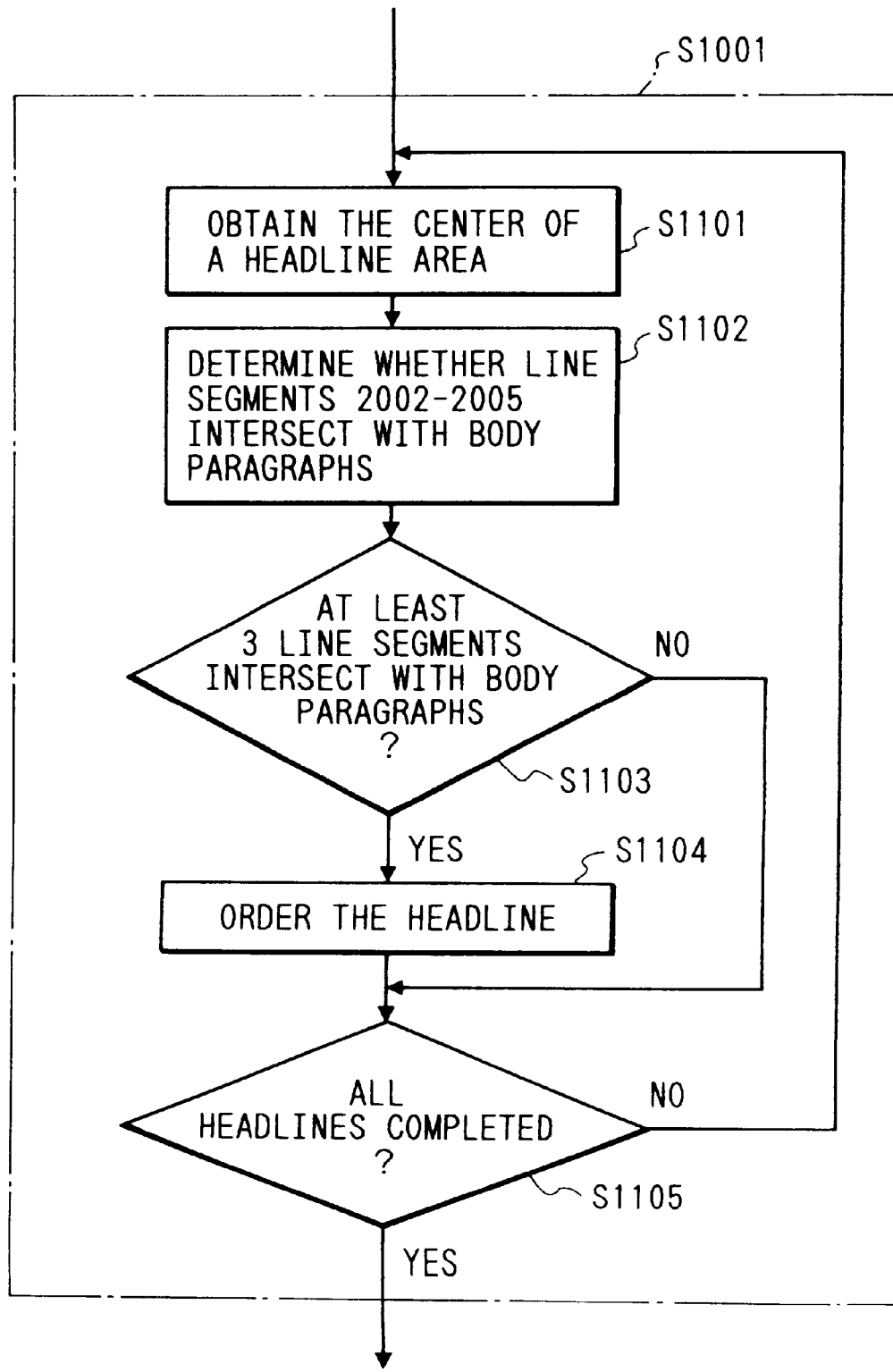
FIG. 11 is a flowchart showing a process for ordering a headline surrounded by a body which is executed by the ordering unit.

The process in step S1001 will now be described in detail. FIG. 11 is a flowchart showing the process in step S1001.

In the first step S1101, an attention is paid to one headline area and its center is obtained. In the example of the input original 1401, as shown in FIG. 15, there are two headline areas of the headlines 1502 and 1503. An attention is now paid to the first headline 1503. Since the area is a rectangle, the center is located at a position at which each of the width and height is divided into two parts. Such a center is shown by reference numeral 2001 in FIG. 20.

Figure 20:
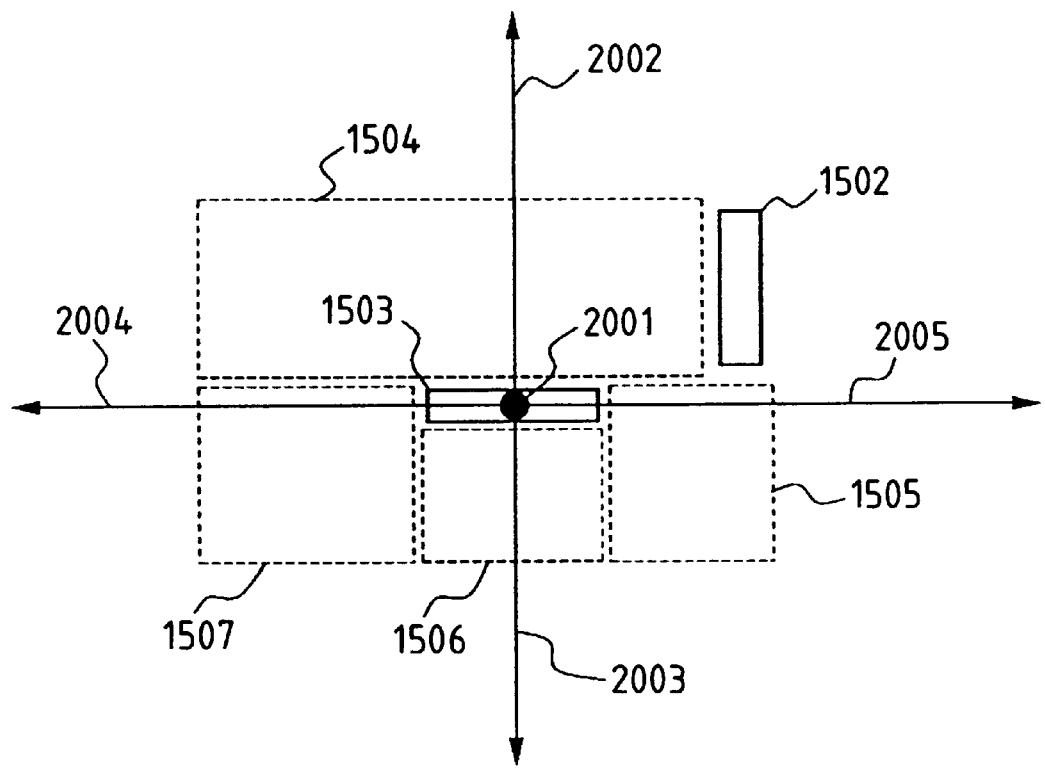

In step S1102, line segments are extended in the upper, lower, left, and right directions from the center 2001 and a check is made to see if they intersect with the body paragraphs or not. In FIG. 20, the line segment which is extended in the upper direction from the center 2001 is shown by a line segment 2002. Likewise, the line segment extending in the lower direction is shown by reference numeral 2003, the line segment extending in the left direction is shown by 2004, and the line segment extending in the right direction is indicated by 2005. As will be obviously understood from FIG. 20, the line segment 2002 intersects with the body paragraph 1504. Similarly, the line segment 2003 intersects with the body paragraph 1506, the line segment 2005 intersects with the body paragraph 1505, and the line segment 2004 intersects with the body paragraph 1507.

In step S1103, since the line segments extending from the center in at least three of the upper, lower, left, and right directions intersect with the body paragraphs, the processing routine advances to step S1104. If the line segments extending from the center in only two or less of the upper, lower, left, and right directions intersect with the body paragraphs, the processing routine advances to step S1105.

In step S1104, the notice headline is ordered. Since none of the headlines is ordered yet, No. 1 is ordered to the headline 1503.

In step S1105, a check is made to see if all of the headlines are judged or not. When there are any other headlines, the processing routine is returned to step S1101 and processes similar to those mentioned above are executed. When all of the headlines are judged, step S1002 follows. In the example of the input original 1401, since the headline 1502 is not yet discriminated, the processing routine is returned to step S1101.

In substantially the same manner as the case of the headline 1503, the center is obtained (step S1101), the line segments are extended in the upper, lower, left, and right directions from the center, and a check is made to see if they intersect with the body paragraphs or not (step S1102). As will be also obviously understood from FIG. 15, since no body paragraph exists in the upper and right directions of the headline 1502, the line segments in the upper and right directions extending from the center of the headline 1502 don't intersect with the body paragraphs. Therefore, the processing routine advances from step S1103 to step S1105. Namely, the headline 1502 is not ordered. Since all of the headlines have already been judged in step S1105, all of the processes in step S1001 are finished and step S1002 follows. FIG. 16 shows the result until this stage.

As mentioned above, all of the headlines and body paragraphs are ordered in step S207. FIG. 18 shows a state in which the processes until step S207 have been finished in the example of the input original 1401.

Step S208

Finally, the rectangle data of various kinds of areas obtained as mentioned above is output from the output unit 104 together with the image data.

Figure 12:
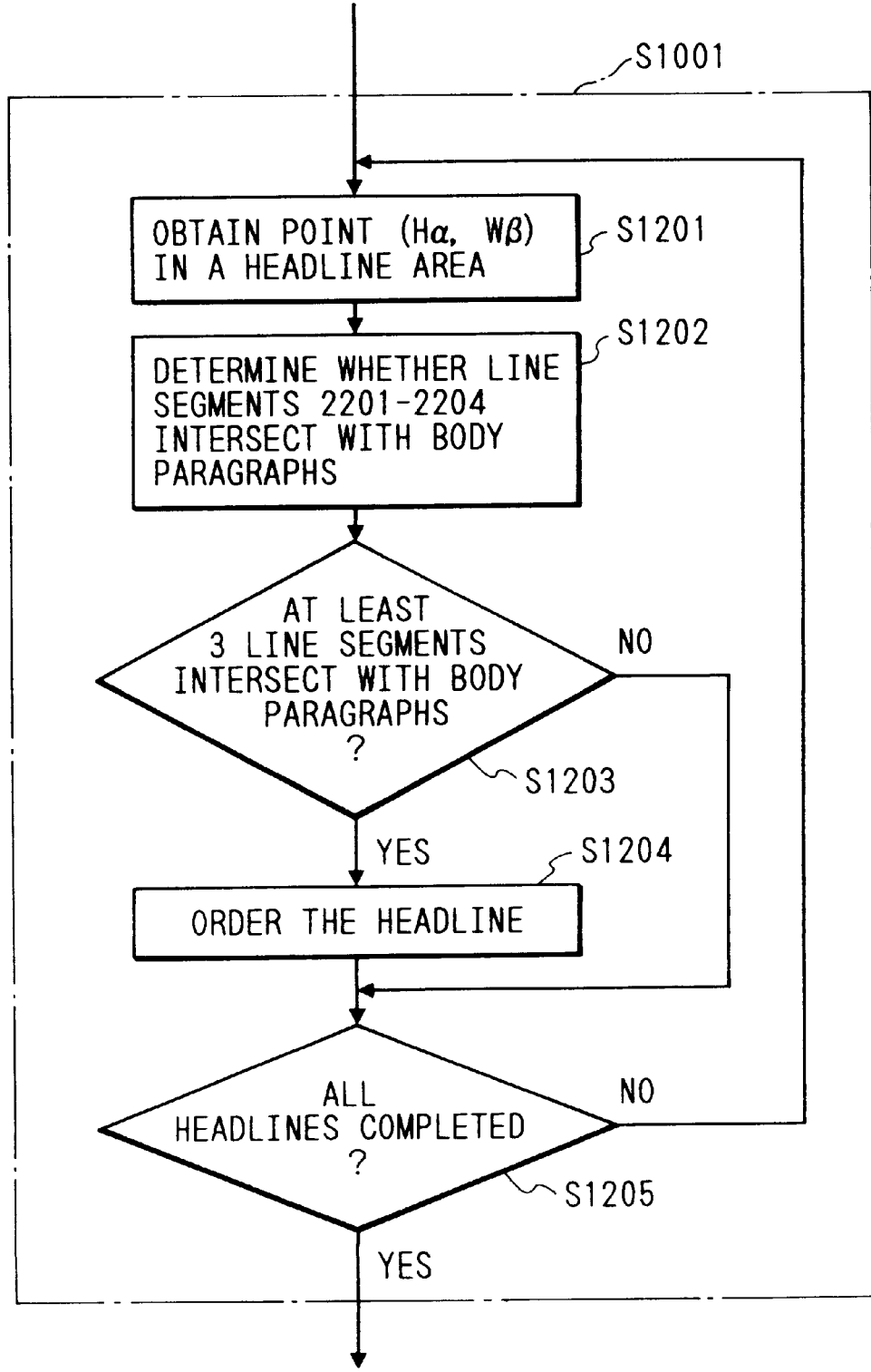
FIG. 12 is a flowchart showing a process for ordering a headline surrounded by a body which is executed by the ordering unit.

FIG. 12 is a flowchart showing processes such that in the process for ordering the headline enclosed by the body, and arbitrary point in the notice headline is used in place of the center 2001 in the judgment regarding whether the rectangle relates to the headline enclosed by the body or not in the example described before (flowchart in FIG. 11). Explanation will now be made hereinbelow with reference to the flowchart shown in FIG. 12.

Figure 21:
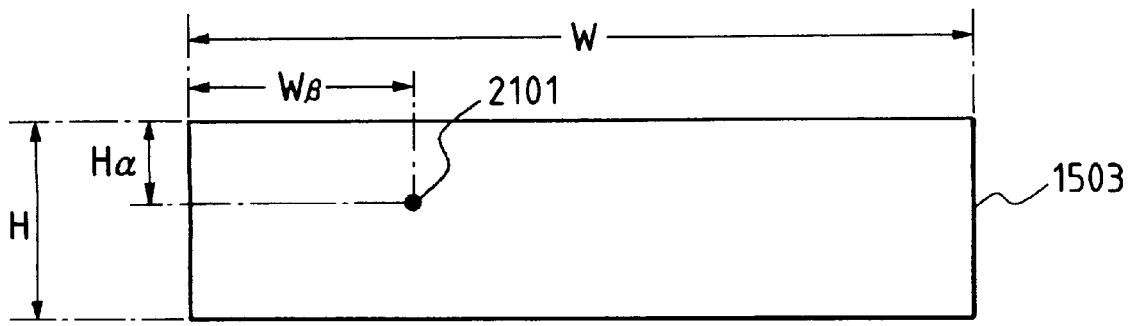
FIG. 21 is a diagram showing a state of obtaining a notice point locating at a position that is α% of the height and β% of the width from the left upper corner of the notice headline.

In the first step S1201, an attention is paid to one headline area and an arbitrary point in the notice headline is obtained. It is now assumed that an arbitrary point is set to the position corresponding to α% of the height and β% of the width from the left upper corner. The value of each of α and β lies within a range from 0 to 100% and predetermined values are held in the RAM. In the example of the input original 1401, as shown in FIG. 15, there are two areas of the headlines 1502 and 1503. An attention is first -paid to the headline 1503 here. An arbitrary point in the headline 1503 is fetched and is used as a notice point. FIG. 21 is a diagram for explaining a state in which an arbitrary point locating at the position corresponding to α% of the height and β% of the width from the left upper corner is obtained. In FIG. 21, H denotes the height of headline 1503, Hα indicates α% of the height from the left upper corner, W shows the width of the headline 1503, and Wβ indicates β% of the width from the left upper corner. A notice point 2101 is obtained as mentioned above. It is now assumed that α is equal to 40% and β is equal to 25%.

Figure 22:
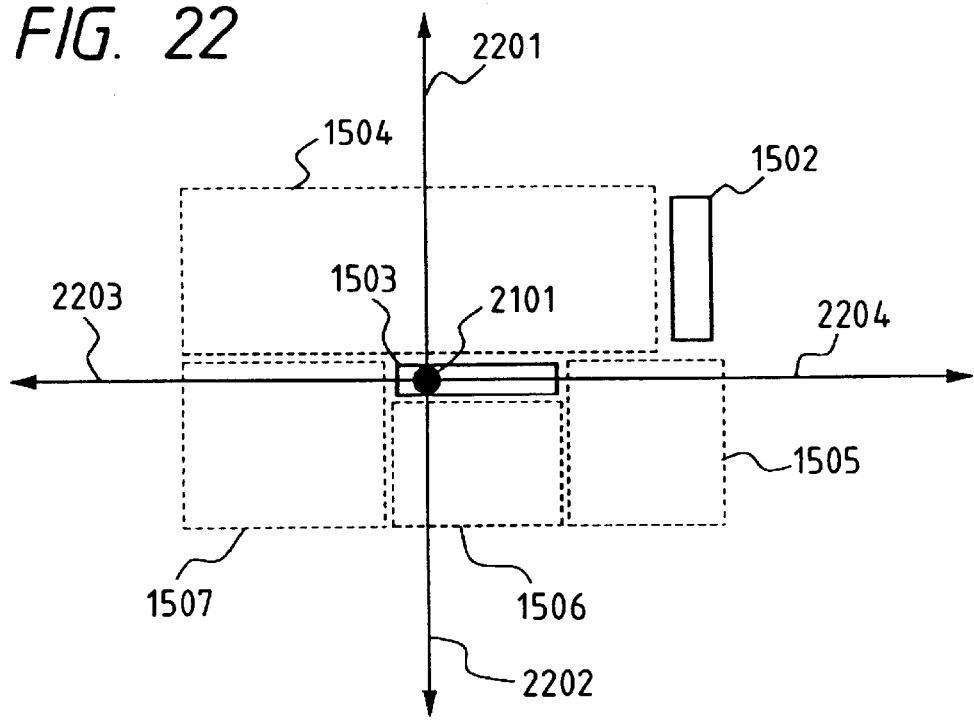

In step S1202, line segments are subsequently extended in the upper, lower, left, and right directions from the notice point 2101 and a check is made to see if they intersect with the body paragraphs or not, respectively. In FIG. 22, the line segment extending in the upper direction from the notice point 2101 is shown by a line segment 2201. Similarly, the line segment extending in the lower direction is shown by 2202, the line segment extending in the left direction is shown by 2203, and the line segment extending in the right direction is shown by 2204. As will be obviously understood from FIG. 22, the line segment 2201 intersects with the body paragraph 1504. Likewise, the line segment 2202 intersects with the body paragraph 1506, the line segment 2204 intersects with the body paragraph 1505, and the line segment 2203 intersects with the body paragraph 1507.

In step S1203, since the line segments extending from the notice point 2101 intersect in at least three of the upper, lower, left, and right directions, the processing routine advances to step S1204. If the line segments extending from the notice point 2101 in only two of the upper, lower, left, and right directions intersect with the body paragraph, step S1205 follows.

In step S1204, the notice headline is ordered. Since none of the headlines is ordered here, No. 1 is ordered to the headline 1503.

A check is now made to see if all of the headlines have been judged or not in step S1205. If there are any other headlines, the processing routine is returned to step S1201 and processes similar to those mentioned above are executed. After all of the headlines were judged, step S1002 follows. In the example of the input original 1401, since the headline 1502 is not yet judged, the processing routine is returned to step S1201.

In substantially the same manner as the case of the headline 1503, a notice point is obtained (step S1201), line segments are extended in the upper, lower, left, and right directions from the notice point, and a check is made to see if they intersect with the body paragraphs or not (step S1202). As will be also obviously understood from FIG. 15, since no body paragraph exists in the upper and right directions of the headline 1502, the line segments in the upper and right directions extending from the center of the headline 1502 don't intersect with the body paragraphs. Therefore, the processing routine advances from step S1203 to step S1205. Namely, the headline 1502 is not ordered. In step S1205, since all of the headlines have been judged, all of the processes in step S1001 are finished and step S1002 follows. FIG. 16 shows the results until this stage.

As mentioned above, all of the headlines and body paragraphs are ordered in step S207. FIG. 18 shows a state in which the processes until step S207 have been finished in the example of FIG. 14.

The processes other than step S1001 are similar to those in the first embodiment. A construction of an image processing apparatus in the second embodiment is similar to that of the first embodiment shown in FIG. 1. By the above description, operation and effects similar to those in the first embodiment mentioned above are obtained.

Figure 13:
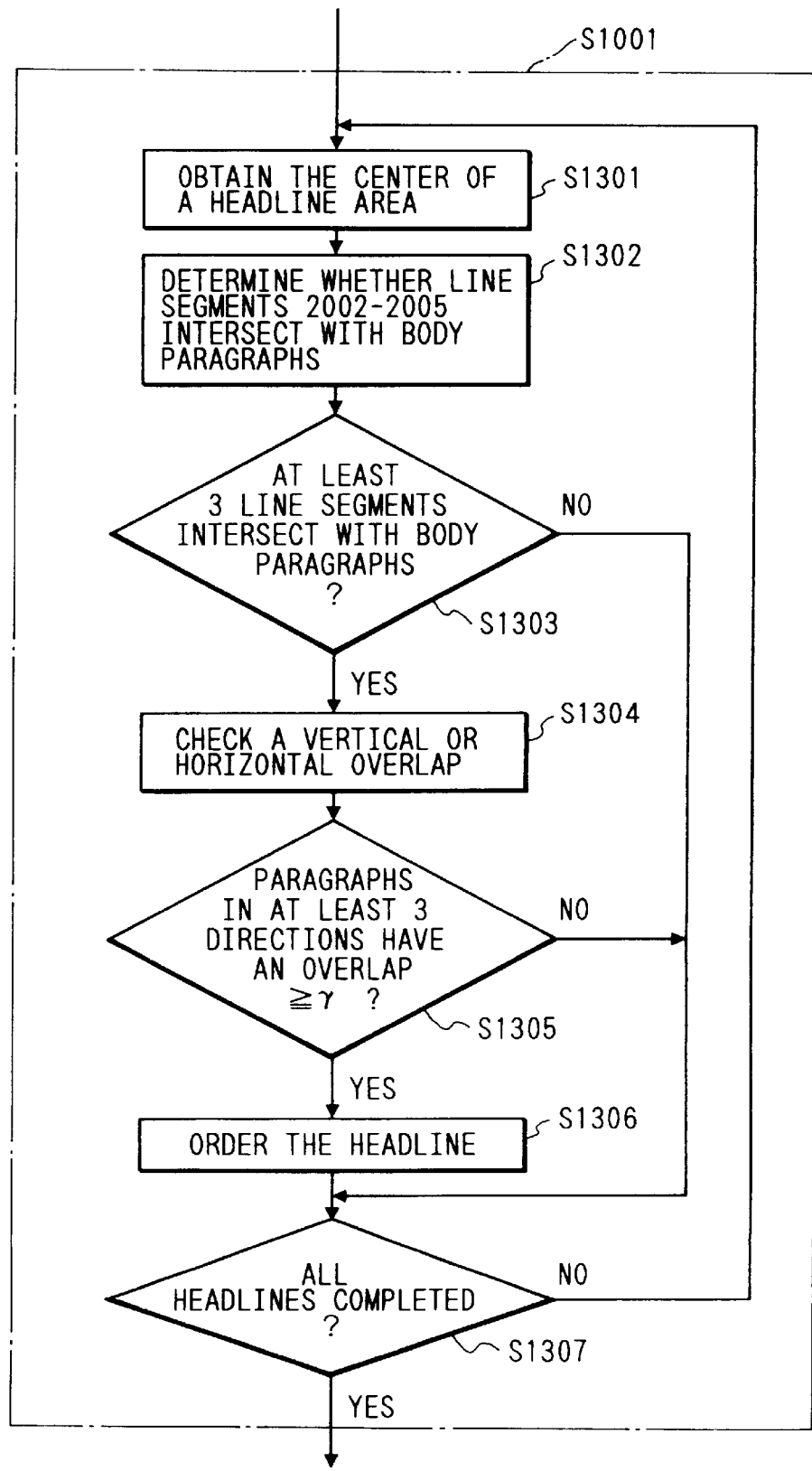
FIG. 13 is a flowchart showing a process for ordering a headline surrounded by a body which is executed by the ordering unit.

FIG. 13 is a flowchart showing processes in which the processing contents in steps S1305 and S1306 are further added to the process to order the headline enclosed by the body in step S1001 in FIG. 10 and in which overlap degrees with the body paragraphs in the upper, lower, left, and right directions of the notice headline are discriminated and, when the body paragraphs in which the overlap degree is equal to or larger than a threshold value exist in three or more directions, the notice headline is ordered.

Explanation will now be made hereinbelow with reference to a flowchart shown in FIG. 13.

In the first step S1301, an attention is paid to one headline area and its center is obtained. In the example of the input original 1401, as shown in FIG. 15 there are two headline areas of the headlines 1502 and 1503. An attention is first paid to the headline 1503. Since the area is a rectangle, the center is located at a position at which each of the width and height is divided into two equal parts. Such a center is shown by reference numeral 2001 in FIG. 20.

In step S1302, line segments are extended in the upper, lower, left, and right directions from the center 2001 and a check is made to see if they intersect with the body paragraphs or not. In FIG. 20, the line segment extending in the upper direction from the center 2001 is shown by the line segment 2002. Similarly, the line segment extending in the lower direction is shown by 2003, the line segment extending in the left direction is shown by 2004, and the line segment extending in the right direction is shown by 2005. As will be obviously understood from FIG. 20, the line segment 2002 intersects with the body paragraph 1504. Likewise, the line segment 2003 intersects with the body paragraph 1506, the line segment 2005 intersects with the body paragraph 1505, and the line segment 2004 intersects with the body paragraph 1507.

In step S1303, since the line segments extending from the center intersect with the body paragraphs in three or more of the upper, lower, left, and right directions as mentioned above, the processing routine advances to step S1304. If the line segments extending from the center intersect with the body paragraphs in only two or less of the upper, lower, left, and right directions, step S1307 follows.

Figure 23:
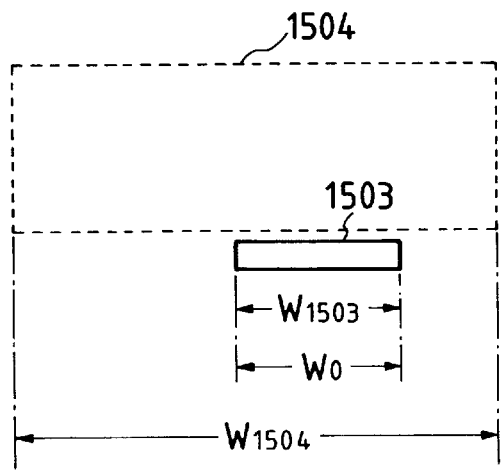
FIG. 23 is a diagram showing an overlap degree of the paragraphs in the vertical direction.

In step S1304, with respect to the body paragraphs locating in the upper and lower directions of the headline, overlap degrees in the vertical direction with the headline are examined. Likewise, with regard to the body paragraphs locating in the left and right directions, overlap degrees in the horizontal direction with the headline are judged, respectively. When the overlap degree with the body paragraph 1504 locating in the upper direction of the headline 1503 is judged, as shown in FIG. 23, an overlap between the width W1503 of the headline 1503 and the width W1504 of the body paragraph 1504 is indicated by W0. In the example, W0=W1503. On the basis of those values, the overlap degrees are judged as follows in step S1305. When the following relation (length of overlap in the vertical direction between two areas)/(width of area of a smaller width in two areas) >(threshold value γ)

is satisfied, the overlap degree is equal to or larger than the threshold value. The threshold value γ lies within a range from 0.0 to 1.0 and is set to γ=0.8 here.

In the example shown in FIG. 23, since

W0/W1503>γ the overlap degree between the body paragraph 1504 and the headline 1503 is equal to or larger than the threshold value.

Figure 24:
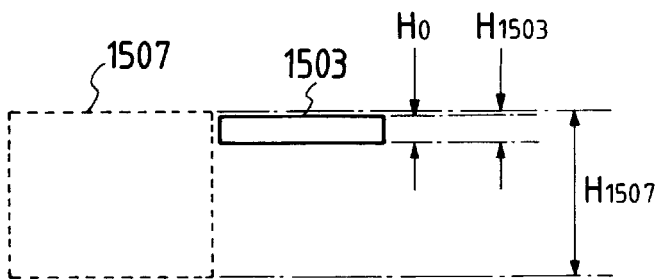
FIG. 24 is a diagram showing an overlap degree of the paragraphs in the horizontal direction.

Similarly, the overlap degree between the headline 1503 and the body paragraph 1506 locating under the headline 1503 is also equal to or larger than the threshold value. In a manner similar to the above, the overlap degree between the headline 1503 and the body paragraph 1507 locating on the left side of the headline 1503 is judged. As shown in FIG. 24, the height of headline 1503 is shown by H1503, the height of body paragraph 1507 is shown by H1507, and the overlap degree between the headline 1507 and the body paragraph 1507 is shown by H0. In this example, H0=H1503. In step S1305, the overlap degrees are judged as follows on the basis of those values. When the following relation (length of overlap in the horizontal direction between two areas)/(height of area of a smaller height in two areas) >(threshold value γ)

is satisfied, the overlap degree is equal to or larger than the threshold value. However, the threshold value lies within a range from 0.0 to 1.0 and is set to 0.8 here.

In the example shown in FIG. 24, since

H0/H1503>γ the overlap degree between the body paragraph 1507 and the headline 1503 is equal to or larger than the threshold value. Similarly, the overlap degree between the headline 1503 and the body paragraph 1505 locating on the right side thereof is also equal to or larger than the threshold value.

As mentioned above, in the example of FIG. 14, since the body paragraphs in which the overlap degree is equal to or larger than the threshold value exist in three or more directions, the processing routine advances to step S1306.

In step S1306, the notice headline is ordered. Since none of the headlines is yet ordered here, No. 1 is ordered to the headline 1503. A check is made to see if all of the headlines have been checked or not. When there are any other headlines, the processing routine is returned to step S1301 and processes similar to those mentioned above are executed. After all of the headlines were checked, step S1002 follows.

In the example of the input original 1401, since the headline 1502 is not yet checked, the processing routine is returned to step S1301. In substantially the same manner as the case of the headline 1503, the center is obtained (step S1301), line segments are extended in the upper, lower, left, and right directions from the center, and a check is made to see if they intersect with the body paragraphs or not, respectively (step S1302). As will be also obviously understood from FIG. 15, since no body paragraph exists in the upper and right directions of the headline 1502, the line segments extending in the upper and right directions from the center of the headline 1502 don't intersect with the body paragraphs. Therefore, the processing routine advances from step S1303 to step S1307. Namely, the headline 1502 is not ordered.

In step S1307, since all of the headlines were checked, all of the processes in step S1001 are finished and step S1002 follows. FIG. 16 shows the results until this stage.

As mentioned above, all of the headlines and body paragraphs are ordered in step S207. FIG. 18 shows a state after the processes until step S207 were finished in the example of FIG. 14.

Embodiment 2

In the embodiment, explanation will now be made with respect to an example in which radial line segments are extended from the rectangle whose attribute was determined to be a table and a table area is identified from the number of intersections with the table frame. A construction of an apparatus of the embodiment is similar to that of the embodiment.

FIG. 2 is a flowchart showing image processes in the image processing apparatus of the embodiment. Control programs for executing the image processes have been stored in the memory unit 103. In the flowchart, the same processing steps as those in the embodiment 1 are designated by the same reference numerals and their descriptions are omitted here.

Step S209

Figure 28:
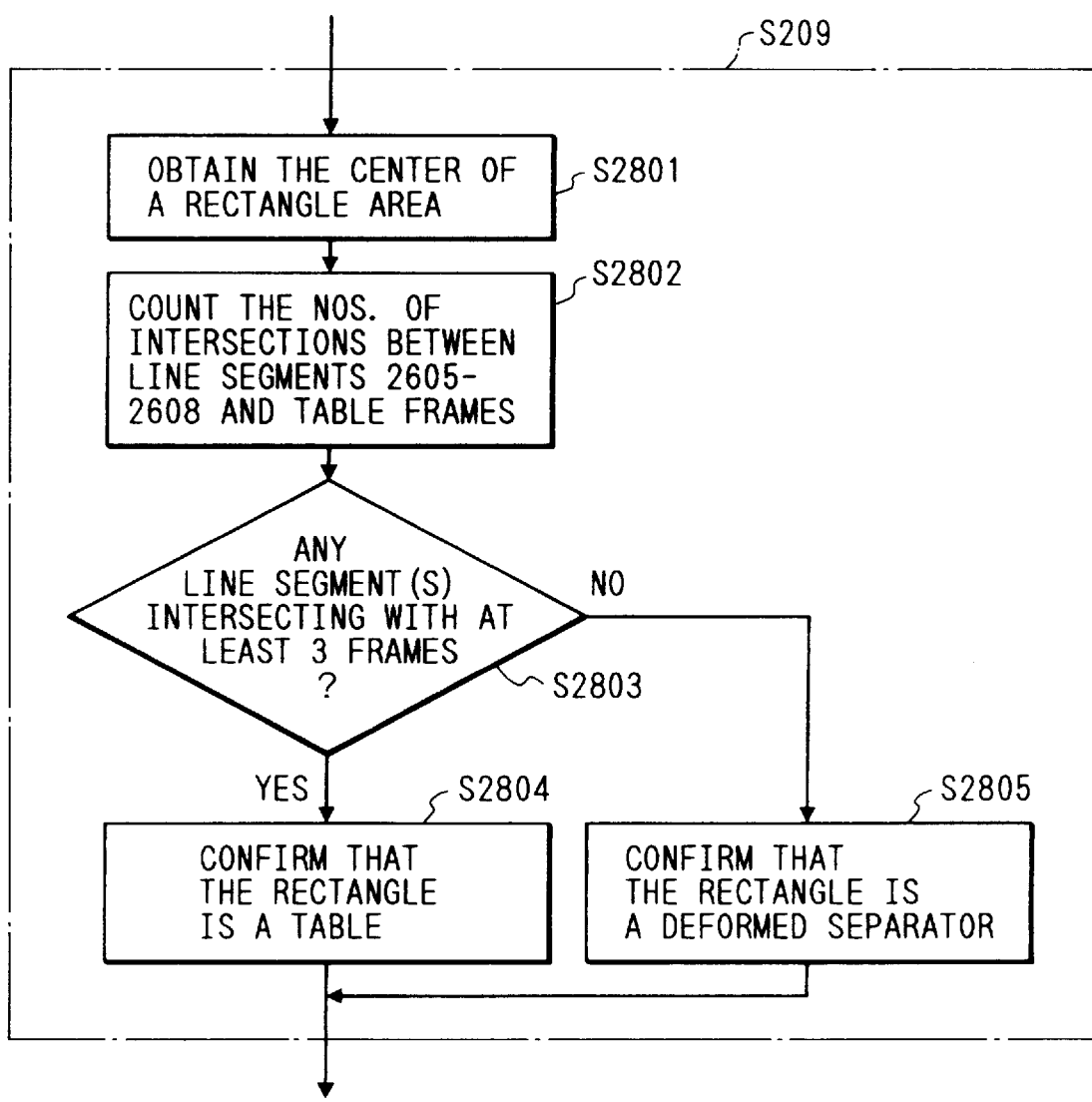
FIG. 28 is a flowchart showing an example of processes of a table area identifier.

A table area is identified by a table area identifier 112. FIG. 28 is a flowchart for explaining in detail a process for identifying a table area in step S209.

Figure 26:
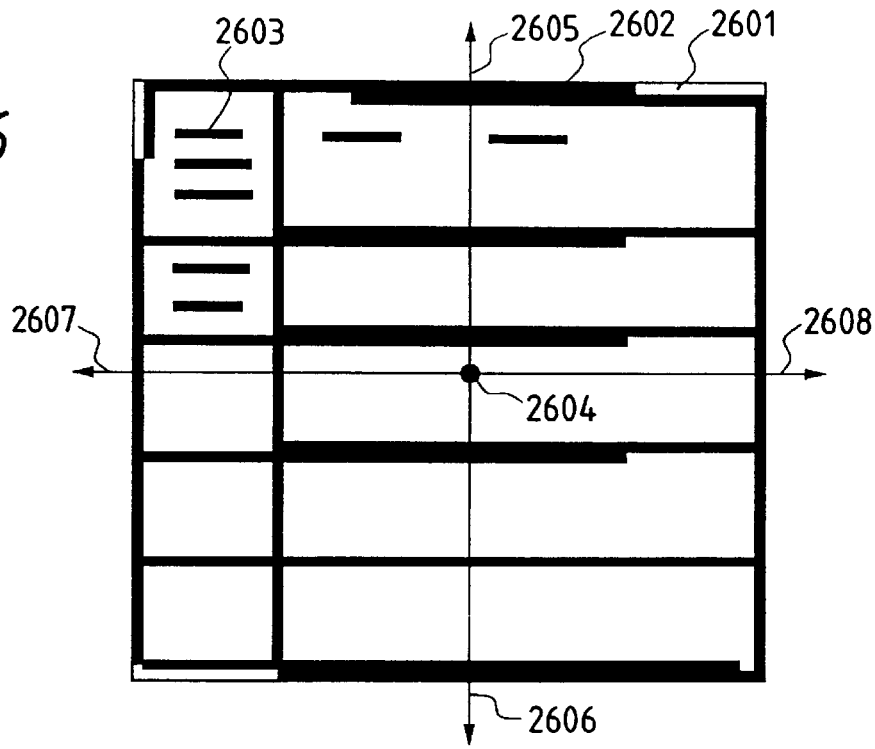
FIG. 26 is a diagram showing a table and rectangles showing areas of the table.

FIG. 26 is a diagram for explaining step S209 in case of a table. Reference numeral 2601 denotes a rectangle area; 2602 a table frame; 2603 a character or the like in the table; 2604 a center (notice point) of the rectangle area 2601; and 2605 to 2608 line segments extending in the upper, lower, left, and right directions from the notice point 2604, respectively.

Figure 27:
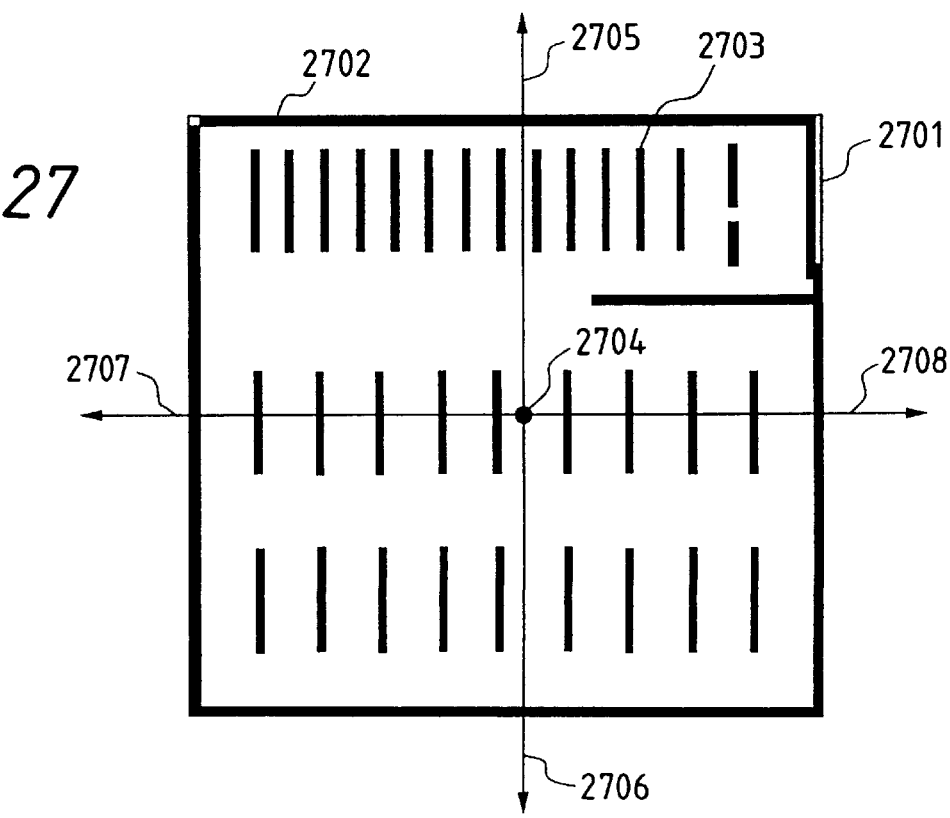
FIG. 27 is a diagram showing deformed separators and rectangles showing areas of the deformed separators.

Similarly, FIG. 27 is a diagram for explaining step S209 in case of a deformed separator. Reference numeral 2701 denotes a rectangle area; 2702 a deformed separator; 2703 a character or the like in the deformed separator; 2704 a center (notice point) of the rectangle area 2701; and 2705 to 2708 line segments extending in the upper, lower, left, and right directions from the notice point 2704, respectively.

Explanation will now be made hereinbelow with respect to the case of a table with reference to a flowchart of FIG. 28 and FIG. 26.

In the embodiment, it is assumed that a center is set to one arbitrary notice point in the rectangle area which was decided to be a table and total four line segments are extended one by one in the upper, lower, left, and right directions. There is used table identifying means for identifying the rectangle area as a table in the case where one (or more) notice point such that at least one of the line segments extending in the upper, lower, left, and right directions intersects with the table frame three or more times exists or for identifying the rectangle area as a deformed separator in the case other than the above case.

The center of the rectangle area is first obtained and set into the notice point in step S2801.

The position at which each of the width and height is divided into two equal parts is set to the center and the notice point 2604 is obtained.

In step S2802, line segments are subsequently extended in the upper, lower, left, and right directions from the notice point 2604 and the number of intersections with the table frame is counted. In FIG. 26, the line segment extending in the upper direction from the notice point 2604 is indicated by a line segment 2605. Similarly, the line segment extending in the lower direction is shown by 2606, the line segment extending in the left direction is shown by 2607, and the line segment extending in the right direction is shown by 2608.

The number of intersections with the table frame is equal to three in case of the line segment 2605, three in case of the line segment 2606, two in case of the line segment 2607, and one in case of the line segment 2608.

A check is made in step S2803 to see if there are line segments which intersect with the table frame three or more times among the line segments extending in the upper, lower, left, and right directions or not. Since the line segments 2605 and 2606 intersect with the table frame three or more times, step S2804 follows. If there is no line segment which intersects with the table frame three or more times, step S2805 follows.

In step S2804, the rectangle area is identified as a table area and step S210 follows.

Explanation will now be made with respect to the case of the deformed separator with reference to a flowchart of FIG. 28 and FIG. 27.

First, in step S2801, the center of rectangle area is obtained and set to a notice point. The position which each of the width and height is divided into two equal parts is set to the center and a notice point 2704 is obtained.

In step S2802, line segments are extended in the upper, lower, left, and right directions from the notice point 2704 and the number of intersections with the table frame (deformed separator) is counted. In FIG. 27, the line segment extending in the upper direction from the notice point 2704 is shown by 2705. Similarly, the line segment extending in the lower direction is indicated by 2706, the line segment extending in the left direction is shown by 2707, and the line segment extending in the right direction is shown by 2708.

The number of intersections with the table frame is equal to one in case of the line segment 2705, one in case of the line segment 2706, one in case of the line segment 2707, and one in case of the line segment 2708.

In step S2803, a check is made to see if there are line segments which intersect with the table frame three or more times among the line segments extending in the upper, lower, left, and right directions or not. Since none of the line segments intersects with the table frame three or more times, step S2805 follows.

In step S2805, the rectangle area is identified as a deformed separator area and step S205 follows.

Step S210

Finally, the rectangle data of various kinds of areas obtained as mentioned above is output from the output unit 104 together with the image data.

Figure 31:
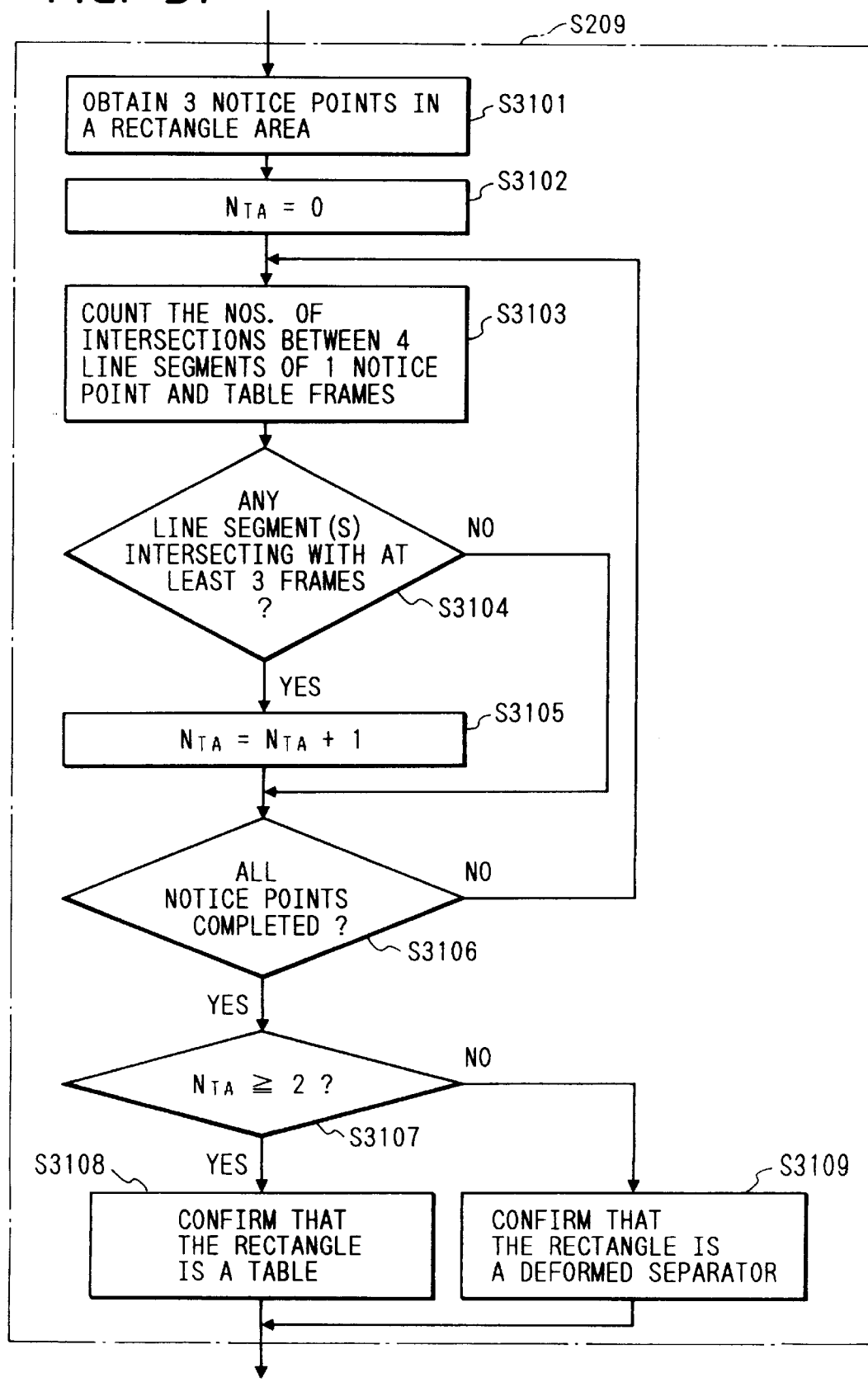
FIG. 31 is a flowchart showing an example of processes of the table area identifier.

FIG. 31 is a flowchart for explaining in detail an example in which a plurality of notice points are set in the rectangle area in the process for identifying the table area in step S209.

Figure 29:
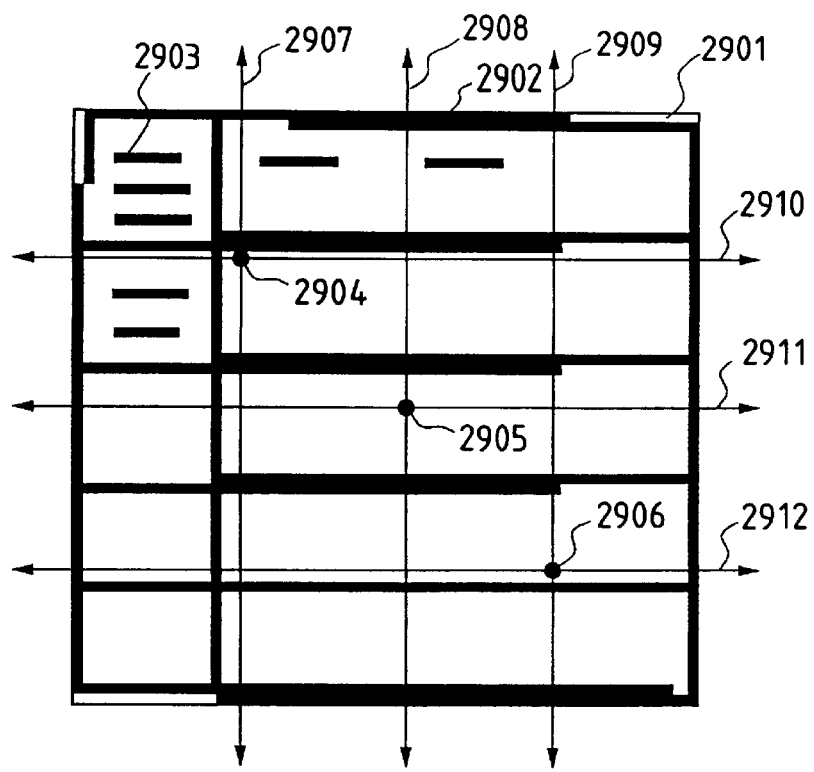
FIG. 29 is a diagram showing a table and rectangles showing areas of the table.

FIG. 29 is a diagram for explaining step S209 in case of a table. Reference numeral 2901 denotes a rectangle area; 2902 a table frame; 2903 a character or the like in the table; 2904 to 2906 arbitrary notice points in the rectangle area; and 2907 to 2912 line segments extending in the upper, lower, left, and right directions from the notice points 2904, 2905, and 2906, respectively.

Figure 30:
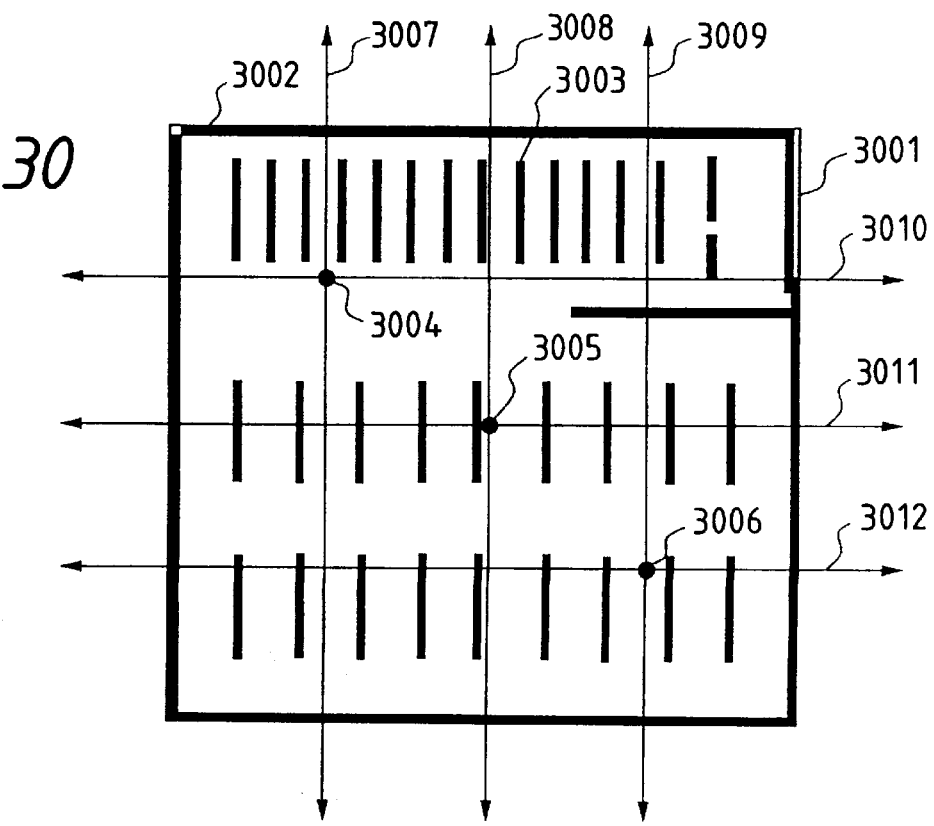
FIG. 30 is a diagram showing deformed separators and rectangles showing areas of the deformed separators.

Similarly, FIG. 30 is a diagram for explaining step S209 in case of a deformed separator. Reference numeral 3001 denotes a rectangle area; 3002 a deformed separator; 3003 a character or the like in the deformed separator; 3004 to 3006 arbitrary notice points in the rectangle area; and 3007 to 3012 line segments extending in the upper, lower, left, and right directions from the notice points 3004, 3005, and 3006, respectively.

Explanation will now be made hereinbelow with respect to the case of a table with reference to FIG. 29 and a flowchart of FIG. 31.

In the embodiment, three arbitrary notice points in the rectangle area which was adjusted as a table are obtained and total 12 line segments are extended. Namely, it is assumed that total four line segments are extended one by one in the upper, lower, left, and right directions for every notice point, respectively. There is used table identifying means for identifying the rectangle area as a table in the case where two or more notice points such that at least one of the line segments extending in the upper, lower, left, and right directions intersects with the table frame three or more times exist and for identifying the rectangle area as a deformed separator in the case other than the above case.

In the first step S3101, three notice points are set in the rectangle area. The point at which each of the width and height is divided into ¼ is set to the target point 2904. The point at which each of the width and height is divided into ½ from the point at the left upper corner is set to the notice point 2905. The point at which each of the width and height is divided into ¾ is set to the notice point 2906.

The number ($N_{TA}$) of table area identified notice points is set to $N_{TA}=0$ in the next step S3102.

In step S3103, line segments are extended in the upper, lower, left, and right directions from the notice point 2904 and the number of intersections with the table frame is counted, respectively. In FIG. 29, the line segments extending in the upper and lower directions from the notice point 2904 are shown by the line segment 2907. The line segments extending in the left and right directions are shown by the line segment 2910.

The number of intersections with the table frame is equal to two in case of the line segment extending in the upper direction, four in case of the line segment extending in the lower direction, two in case of the line segment extending in the left direction, and one in case of the line segment extending in the right direction.

In step S3104, a check is made to see if there are line segments which intersect with the table frame three or more times among the line segments extending in the upper, lower, left, and right directions or not. Since the line segment extending in the lower direction intersects with the table frame three or more times, the processing routine advances to step S3105. If there is no line segment which intersects with the table frame three or more times, step S3106 follows.

In step S3105, "1" is added to the number ($N_{TA}$) of table area identified notice points and step S3106 follows.

(the number of table area identified notice points)=0+1=1

In step S3106, a check is made to see if the processes have been executed for all of the notice points or not. Since the notice points 2905 and 2906 remain, the processing routine is returned to step S3103. Processes similar to those for the notice point 2904 are also executed to the notice points 2905 and 2906. As will be obviously understood from FIG. 29, when the processes for all of the notice points are finished, (the number of table area identified notice points)=3

Since the processes regarding all of the notice points are finished, step S3107 follows.

In step S3107, a check is made to see if (the number of table area identified notice points) is equal to or larger than 2 or not. Since it is equal to or larger than 2, step S3108 follows.

In step S3108, the rectangle area is identified as a table area and step S205 follows.

Explanation will now be made with respect to the case of a deformed separator with reference to FIG. 30 and a flowchart of FIG. 31.

In the first step S3101, three notice points are set in the rectangle area. The point at which each of the width and height is divided into ¼ from the point at the left upper corner is set to the notice point 3004, the point at which each of the width and height is divided into ½ is set to the notice point 3005, and the point at which each of the width and height is divided into ¾ is set to the notice point 3006.

In step S3102, (the number of table area identified notice points) is set to 0.

In step S3103, line segments are extended in the upper, lower, left, and right directions from the notice point 3004 and the number of intersections with the table frame is counted. In FIG. 31, the line segments extending in the upper and lower directions from the notice point 3004 are shown by a line segment 3007. The line segments extending in the left and right directions are shown by a line segment 3010.

The number of intersections with the table frame is equal to one in case of the line segment extending in the upper direction, one in case of the line segment extending in the lower direction, one in case of the line segment extending in the left direction, and one in case of the line segment extending in the right direction, respectively.

In step S3104, a check is made to see if there are line segments which intersect with the table frame three or more times among the line segments extending in the upper, lower, left, and right directions or not. Since none of the line segments extending in the upper, lower, left, and right directions intersects the table frame three or more times, step S3106 follows.

In step S3106, a check is made to see if the processes have been executed for all of the notice points or not. Since the notice points 3005 and 3006 remain, the processing routine is returned to step S3103. Processes similar to those in the notice point 3004 are also executed for the notice points 3005 and 3006. As will be obviously understood from FIG. 30, when the processes are finished for all of the notice points, (the number of table area identified notice points)=0 Since the processes about all of the notice points have been finished, step S3107 follows.

In step S3107, a check is made to see if (the number of table area identified notice points) is equal to or larger than 2 or not. Since it is smaller than 2, step S3109 follows.

In step S3109, the rectangle area is identified as a deformed separator area and step S210 follows.

Figure 34:
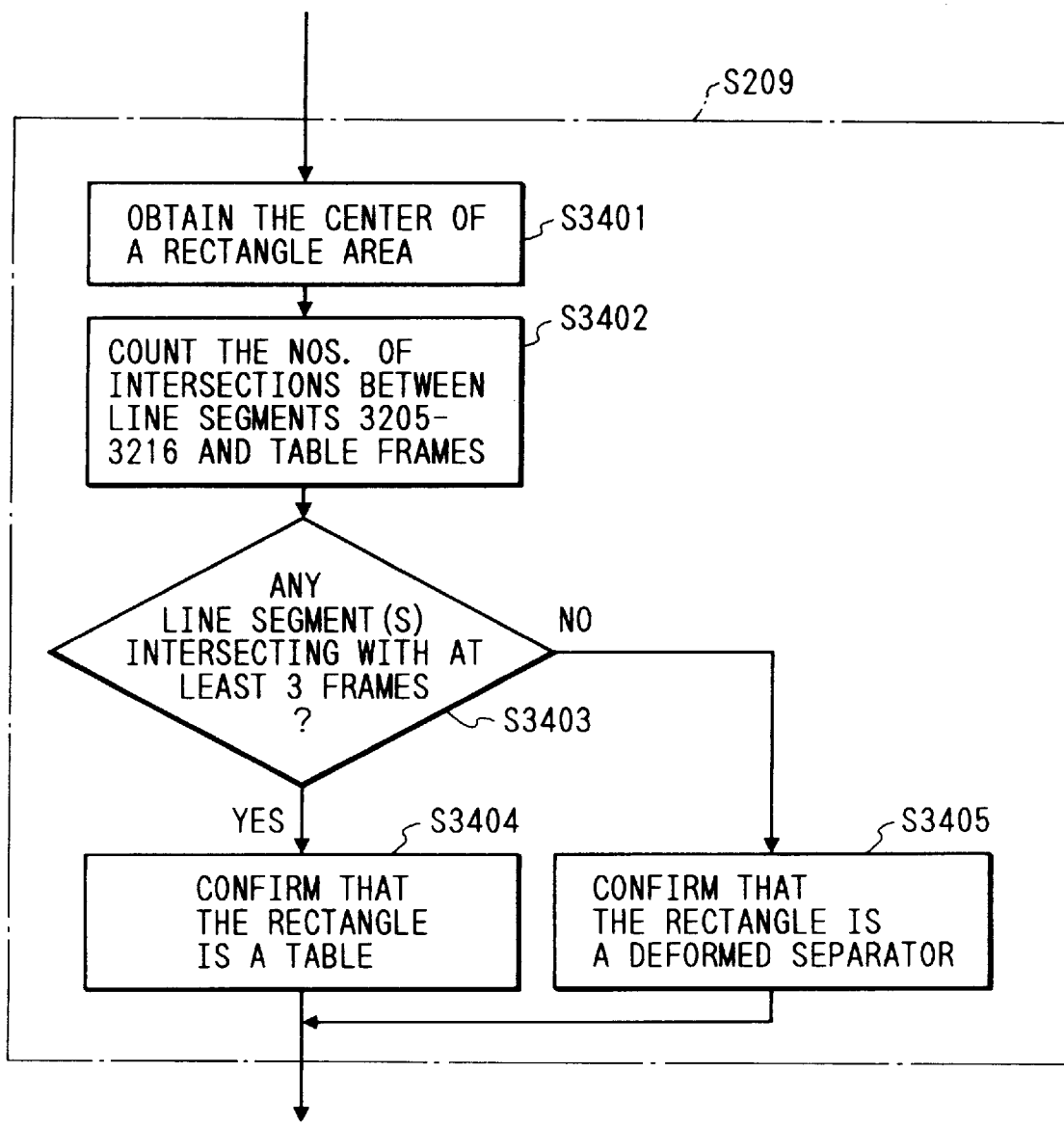
FIG. 34 is a flowchart showing an example of processes of the table area identifier.

FIG. 34 is a flowchart for explaining in detail an example in which a plurality of line segments extending in the upper, lower, left, and right directions are set in the table area identifying process in step S209.

Figure 32:
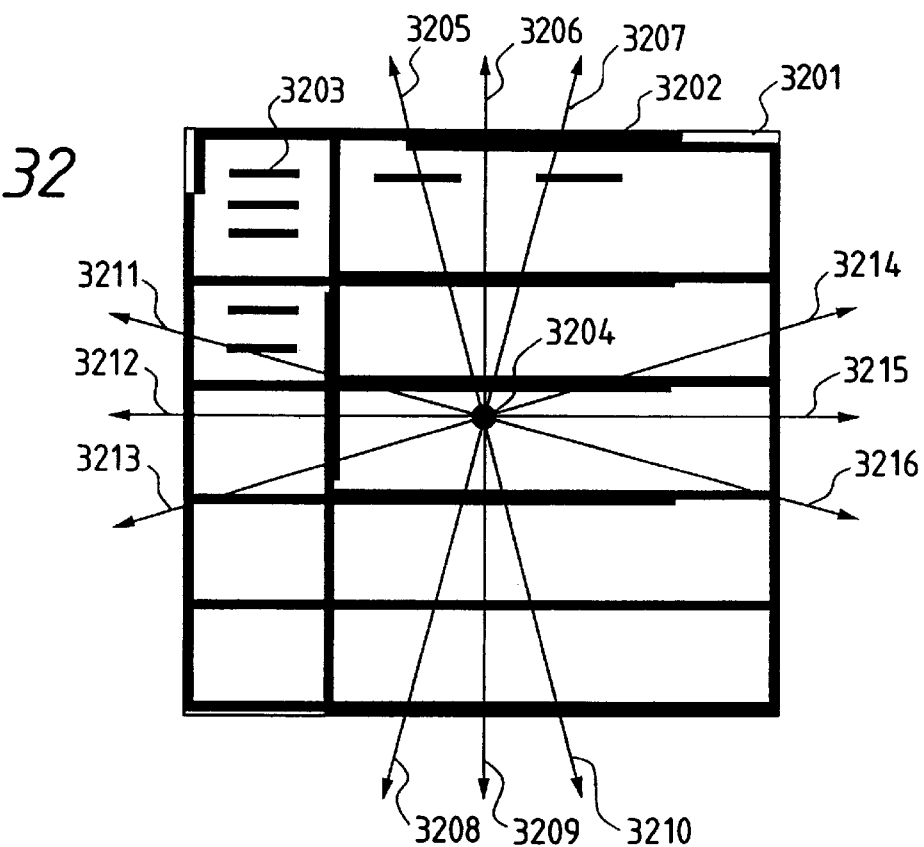
FIG. 32 is a diagram showing a table and rectangles showing areas of the table.

FIG. 32 is a diagram for explaining step S209 in case of the table. Reference numeral 3201 denotes a rectangle area; 3202 a table frame; 3203 a character or the like in the table; 3204 a center (notice point) in the rectangle area; 3205 to 3207 line segments extending in the upper direction from the notice point 3204; 3208 to 3210 line segments extending in the lower direction from the notice point 3204; 3211 to 3213 line segments extending in the left direction from the notice point 3204; and 3214 to 3216 line segments extending in the right direction from the notice point 3204.

Figure 33:
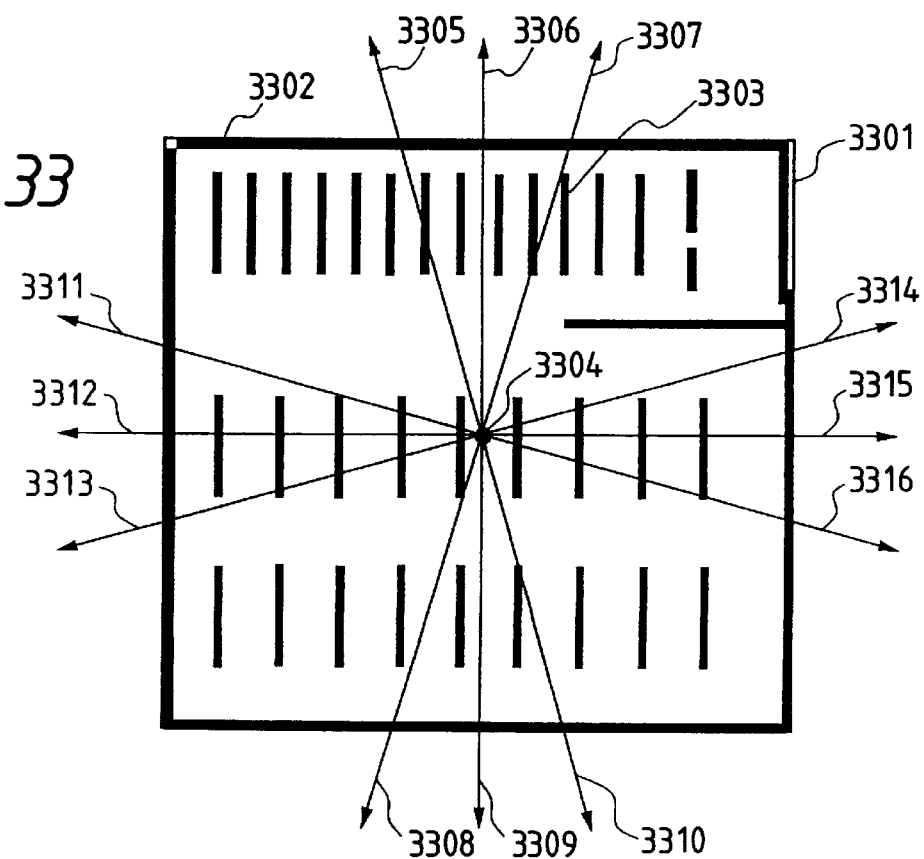
FIG. 33 is a diagram showing deformed separators and rectangles showing areas of the deformed separators.

Similarly, FIG. 33 is a diagram for explaining step S209 in case of a deformed separator. Reference numeral 3301 denotes a rectangle area; 3302 a deformed separator; 3303 a character or the like in the deformed separator; 3304 a center (notice point) in the rectangle area; 3305 to 3307 line segments extending in the upper direction from the notice point 3304; 3308 to 3310 line segments extending in the lower direction from the notice point 3304; 3311 to 3313 line segments extending in the left direction from the notice point 3304; and 3314 to 3316 line segments extending in the right direction from the notice point 3304.

Explanation will now be made hereinbelow with respect to the case of a table with reference to FIG. 32 and a flowchart of FIG. 23.

In the embodiment, it is assumed that a center is set to one arbitrary notice point in the rectangle area which was judged as a table and total 12 line segments are extended, namely, three line segments are extended in each of the upper, lower, left, and right directions, respectively. There is used table identifying means for identifying the rectangle area as a table in the case where one (or more) notice point such that the line segments intersect with the table frame three or more times among the line segments extending in the upper, lower, left, and right directions exists and for identifying the rectangle area as a deformed separator in the case other than the above case.

In the first step S3401, the center of the rectangle area is obtained and set to a notice point.

The position at which each of the width and height is divided into ½ corresponds to the center and the notice point 3204 is obtained.

In the next step S3402, total 12 line segments are extended, namely, three line segments are extended in each of the upper, lower, left, and right directions from the notice point 3204, respectively. The number of intersections with the table frame is counted, respectively. As will be obviously understood from FIG. 32, the number of intersections with the table frame is equal to three in case of each of the line segments 3205, 3206, and 3207, three in case of each of the line segments 3208, 3209, and 3210, two in case of each of the line segments 3211, 3212, and 3213, two in case of the line segment 3214, and one in case of each of the line segments 3215 and 3216, respectively.

In step S3403, a check is made to see if there are line segments which intersect with the table frame three or more times among the line segments extending in the upper, lower, left, and right directions or not.

Since the line segments 3205, 3206, 3207, 3208, 3209, and 3210 intersect with the table frame three or more times, respectively, the processing routine advances to step S3404. When there is no line segment which intersects with the table frame three or more times, step S3405 follows.

In step S3404, the rectangle area is identified as a table area and step S210 follows.

Explanation will now be made with respect to the case of a deformed separator with reference to FIG. 33 and a flowchart of FIG. 34.

In the first step S3401, the center of the rectangle area is obtained and set to the notice point.

The position at which each of the width and height is divided into ½ corresponds to the center and the notice point 3304 is obtained.

In the next step S3402, total 12 line segments are extended, namely, three line segments are extended in each of the upper, lower, left, and right directions from the notice point 3304. The number of intersections with the table frame is counted, respectively. As will be obviously understood from FIG. 33, the number of intersections with the table frame is equal to one in case of each of the line segments

3305, 3306, and 3307, one in case of each of the line segments 3308, 3309, and 3310, one in case of each of the line segments 3311, 3312, and 3313, and one in case of each of the line segments 3314, 3315, and 3316.

In step S3403, a check is made to see if there are line segments which intersect with the table frame three or more times among the line segments extending in the upper, lower, left, and right directions or not. Since there is no line segments which intersects with the table frame three or more times, step S3405 follows.

In step S3405, the rectangle area is identified as a deformed separator area and step S210 follows.

Figure 36:
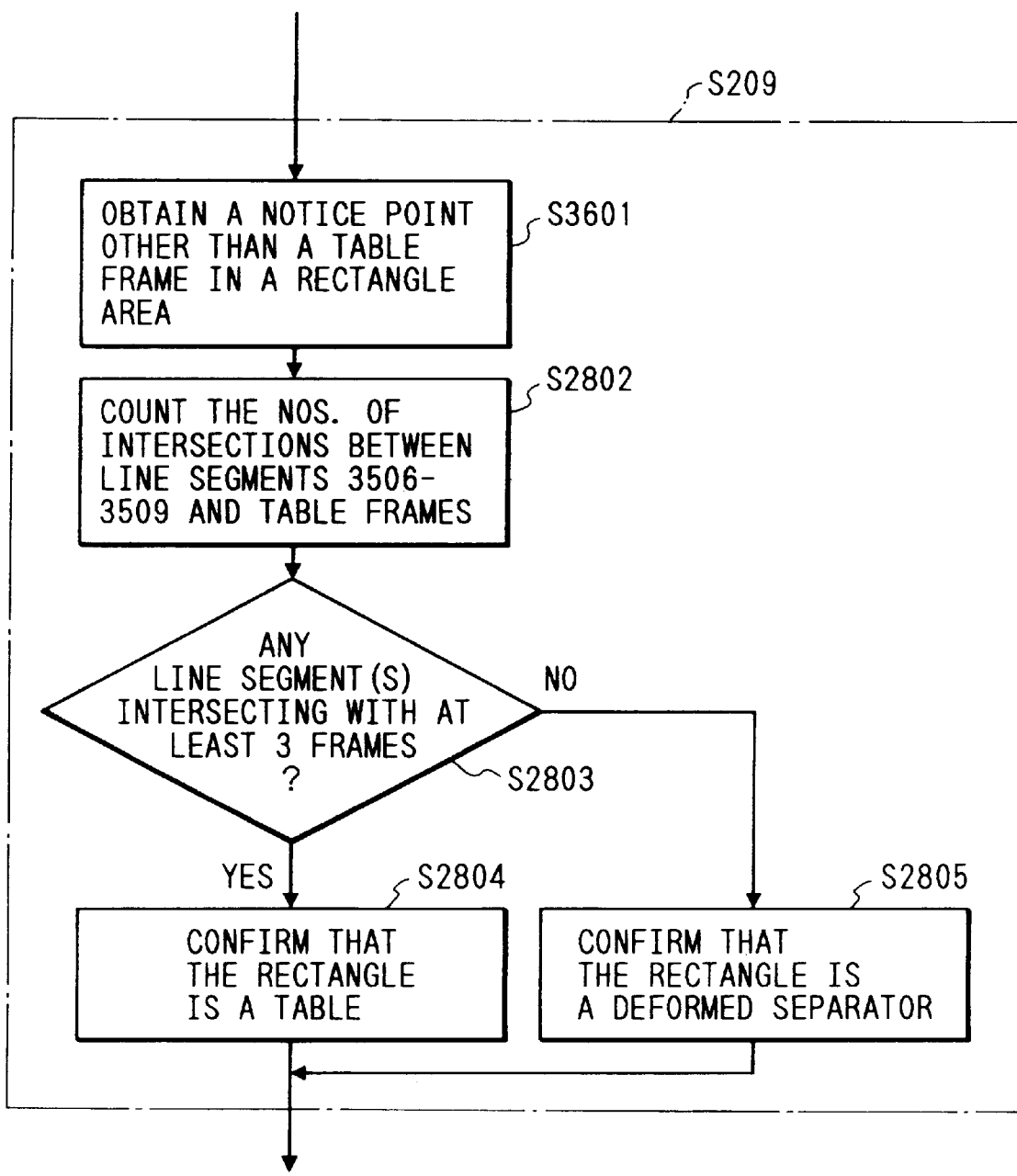
FIG. 36 is a flowchart showing an example of processes of the table area identifier.

FIG. 36 is a flowchart for explaining in detail the table area identifying process in step S209 and shows an example in which a notice point is obtained out of the table frame in the area rectangle (step S1701).

Figure 35:
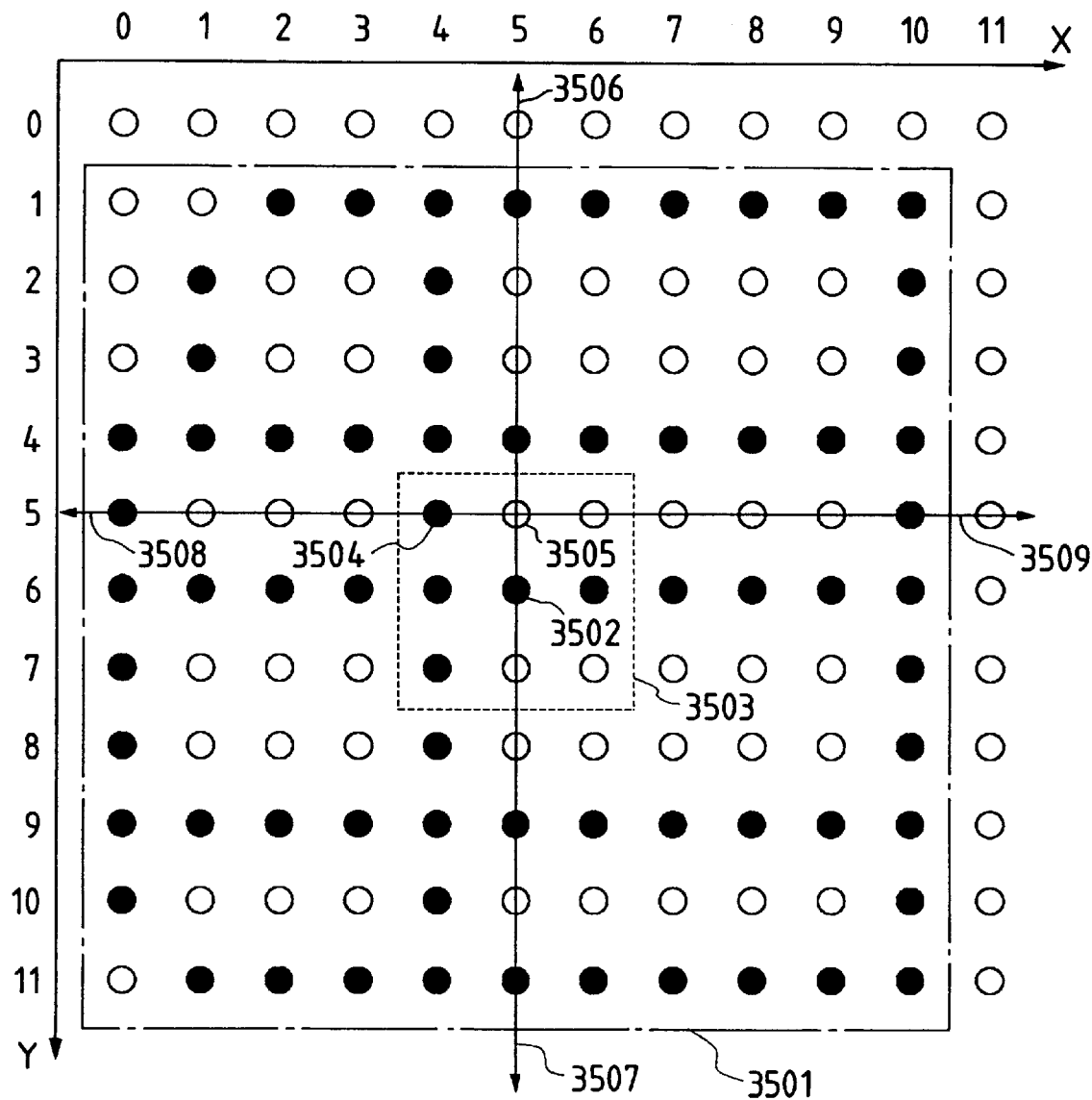
FIG. 35 is a diagram showing a table and rectangles showing areas of the table.

FIG. 35 is a diagram for explaining step S209 in case of a table. Reference numeral 3501 denotes a rectangle area; 3502 a center of the rectangle area 3501; 3503 eight points near the center 3502; 3504 a left upper point among the eight points near the center 3502; 3505 a point just over the center 3502 among the eight points near the center 3502 (the point 3505 corresponds to the notice point); and 3506 to 3509 line segments extending in the upper, lower, left, and right directions from the notice point 3505, respectively. A black circle denotes the pixel which belongs to the table frame. A white circle indicates a pixel other than the table frame.

The black pixels constructing a character or the like in the table are omitted here.

Explanation will now be made hereinbelow with respect to the case of a table with reference to FIG. 35 and a flowchart of FIG. 36.

In the embodiment, it is now assumed that one arbitrary notice point which doesn't belong to the table frame in the rectangle area which was judged as a table is obtained and total four line segments are extended one by one in the upper, lower, left, and right directions. There is used table identifying means for identifying the rectangle area as a table in the case where one or more notice points such that at least one of the line segments extending in the upper, lower, left, and right directions intersects with the table frame three or more times exist and for identifying the rectangle area as a deformed separator in the case other than the above case.

In the first step S3601, a notice point other than the table frame is obtained in the rectangle area.

The center is first obtained as a notice point and a check is made to see if the center belongs to the table frame or not. If NO, the center is set to the notice point. When the center belongs to the table frame, eight points near the center are sequentially clockwise checked from the left upper point. The point which doesn't belong to the table frame is set to the notice point. When such a point is not found out from those eight points, the other points existing on the outside of those eight points are subsequently checked.

The center is first obtained.

The position at which each of the width and height is divided into ½ corresponds to the center and the center 3502 is obtained.

A check is now made to see if the center doesn't belong to the table frame or not. As will be obviously understood from FIG. 35, the center 3502 belongs to the table frame. Since it belongs to the table frame, eight points near the center are examined. First of all, a check is made to see if the left upper point 3504 of the center 3502 belongs to the table frame or not. The near point 3504 belongs to the table frame as will be obviously understood from FIG. 35. Subsequently, the next one of the eight near points is checked clockwise. That is, the next point to be examined is the near point 3505.

As will be obviously understood from FIG. 35, since the near point 3505 doesn't belong to the table frame, the near point 3505 is set to the notice point and step S2802 follows.

In step S2582, line segments are extended in the upper, lower, left, and right directions from the notice point 3505 and the number of intersections with the table frame is counted, respectively. In FIG. 35, the line segment extending in the upper direction from the notice point 3505 is shown by the line segment 3506. Similarly, the line segment extending in the lower direction is shown by 3507. The line segment extending in the left direction is shown by 3508. The line segment extending in the right direction is shown by 3509.

The number of intersections with the table frame is equal to two in case of the line segment 3506, three in case of the line segment 3507, two in case of the line segment 3508, and one in case of the line segment 3509.

In step S2803, a check is made to see if there are line segments which intersect with the table frame three or more times among the line segments extending in the upper, lower, left, and right directions or not. Since the line segment 3507 intersects with the table frame three or more times, step S2805 follows. If there is no line segment which intersects with the table frame three or more times, step S2806 follows.

In step S2805, the rectangle area is identified as a table area and step S210 follows.

In step S2806, the rectangle area is identified as a deformed separator area and step S210 follows.

When an image is inputted in step S201, a check is made to see if it is a multi-value image or not. In case of the multi-value image, it is converted into a binary image, so that the area dividing process can be executed even in the case where the input image is a multi-value image such as a color image or the like.

When the image is inputted in step S201, it is also possible to construct in a manner such that when the number of pixels of the input image is so large as to need a fairly long processing time, by executing an image thinning process for thinning out the image of m dots (in the vertical direction)×n dots (in the horizontal direction) into one pixel, the processing speed can be raise.

In the detection or the like of the separator in step S203, it is also possible to execute the further detailed classification of the area attributes by distinguishing the rectangle label on the basis of a difference between the vertical/horizontal direction of the separator, a difference the threshold values when the figure, table, or the like is obtained, or the like.

When the table area is identified in step S209, the table area identifying process can be performed without executing a process such that the number of line segments which are extended in the upper, lower, left, and right directions is equivalently distributed in the upper, lower, left, and right directions.

On the other hand, in the table area identification in step S209, in the case where there are a plurality of notice points, the table area identifying process can be performed without executing a process such that the number of line segments which are extended in the upper, lower, left, and right directions is equivalently distributed every notice point.

Embodiment 3

In the embodiment, explanation will now be made with respect to an example in which radial line segments are extended from the rectangle area which was judged as a table and the table area is identified on the basis of the number of intersections with the table frame and the direction. A construction of an apparatus in the embodiment is similar to that of the embodiment 1.

Figure 25:
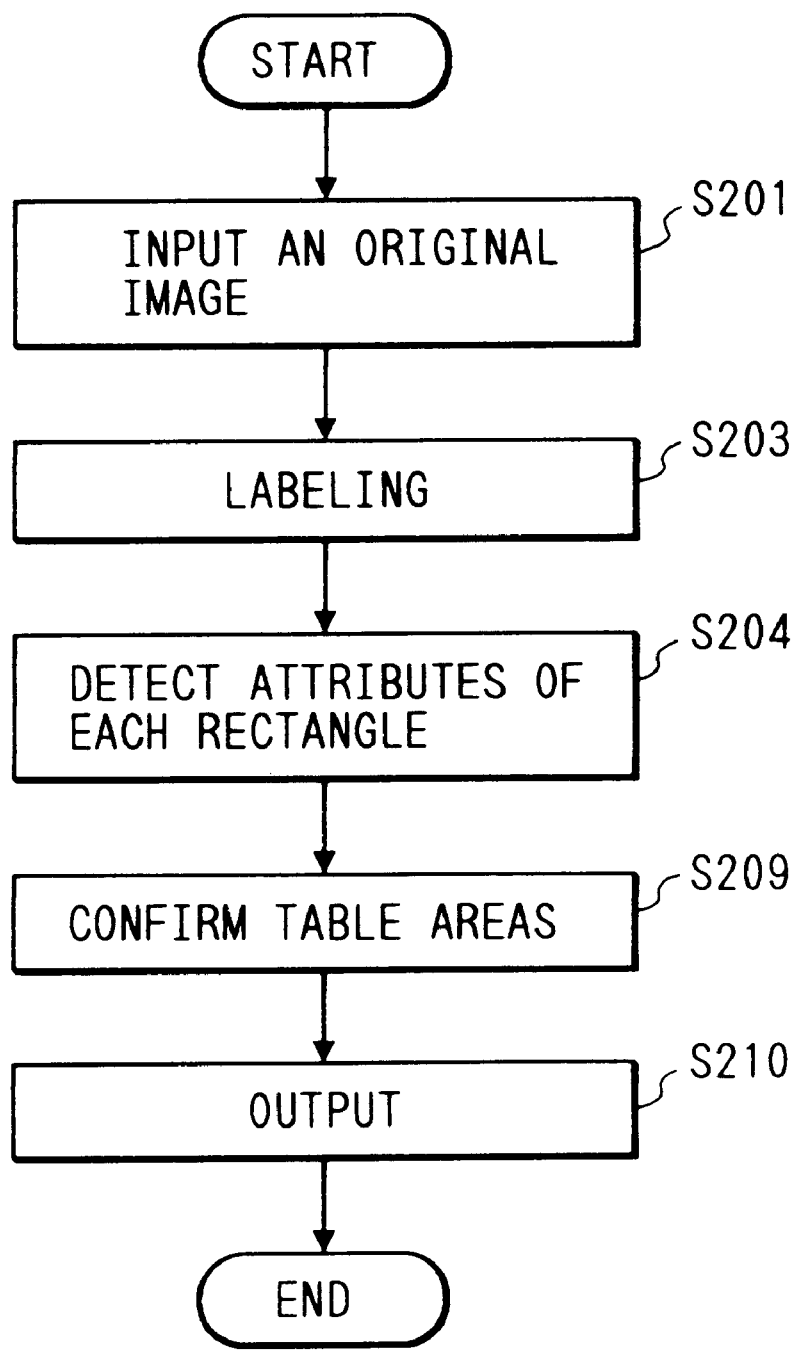
FIG. 25 is a flowchart showing image processes for deciding a table area in the image processing apparatus.

A flowchart showing image processes in the image processing apparatus of the embodiment is similar to the flowchart of FIG. 25 described in the embodiment 2.

Step S209

Figure 37:
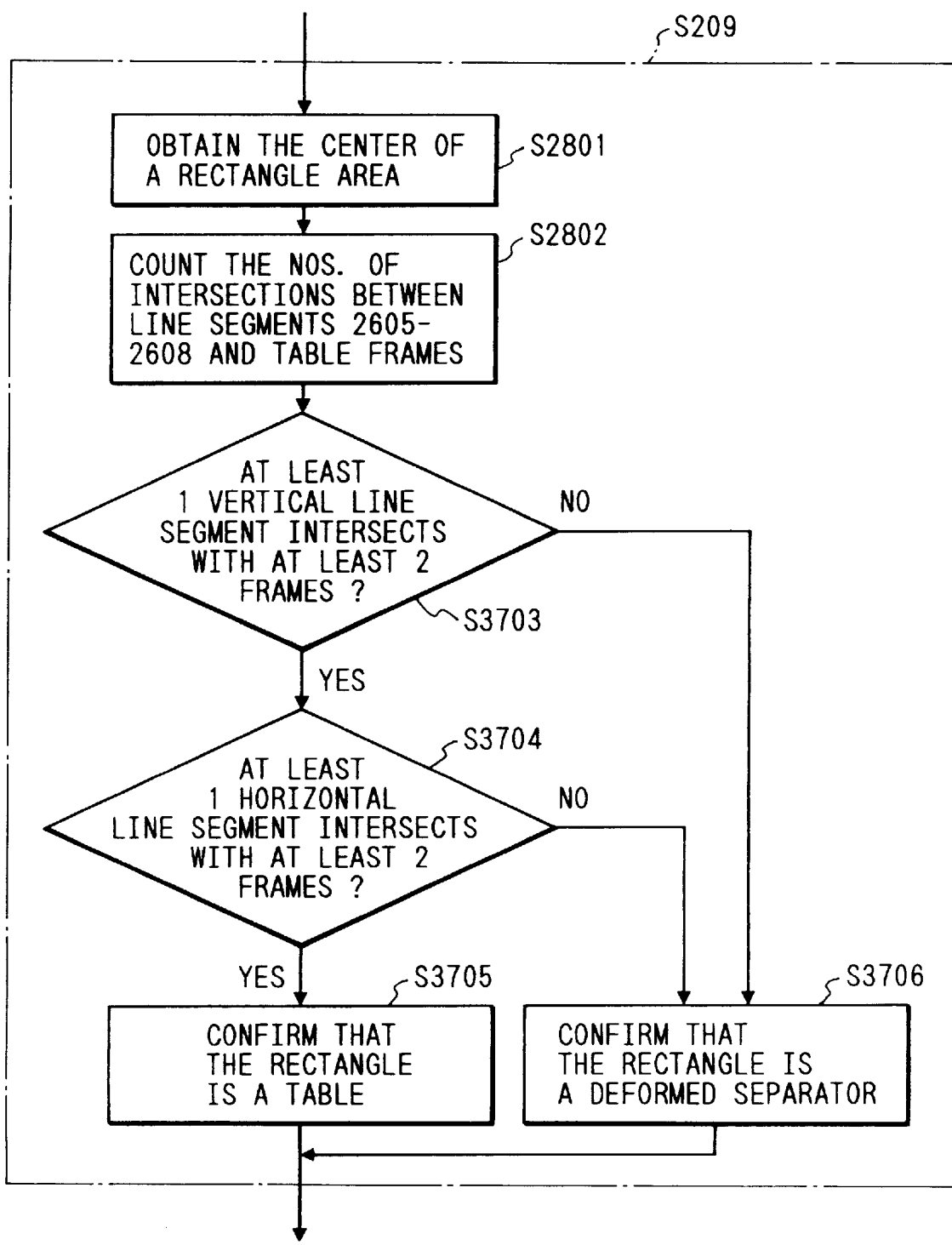
FIG. 37 is a flowchart showing an example of processes of the table area identifier.

A table area is subsequently identified. FIG. 37 is a flowchart for explaining in detail the table area identifying process in step S209. In FIG. 37, processing steps similar to those in FIG. 28 are designated by the same reference numerals and their descriptions are omitted here.

In the embodiment, it is now assumed that a center is set to one arbitrary notice point in the rectangle area which was judged as a table and total four line segments are extended one by one in the upper, lower, left, and right directions. There is used table identifying means for identifying the rectangle area as a table in the case where one (or more) notice point such that at least one of the line segments extending in the upper and lower directions intersects with the table frame two or more times and at least one of the line segments extending in the left and right directions intersects with the table frame two or more times exists and for identifying the rectangle area as a deformed separator in the case other than such a case.

In step S3703, a check is made to see if at least one of the line segments extending in the upper and lower directions intersects with the table frame two or more times or not. Since both of the line segments 2605 and 2606 intersect with the table frame two or more times, step S3704 follows. If there is no line segment which intersects with the table frame two or more times, step S3706 follows.

In step S3704, a check is made to see if at least one of the line segments extending in the left and right directions intersects with the table frame two or more times or not. Since the line segment 2605 intersects with the table frame two or more times, step S3705 follows. If there is no line segment which intersects with the table frame two or more times, step S3706 follows.

In step S3705, the rectangle area is identified as a table area and step S210 follows.

Explanation will now be made with respect to the case of a deformed separator.

In step S3703, a check is made to see if at least one of the line segments extending in the upper and lower directions intersects with the table frame two or more times or not. Since none of the line segments 2705 and 2706 intersects with the table frame two or more times, step S3706 follows.

In step S3706, the rectangle area is identified as a deformed separator area and step S210 follows.

Step S210

Finally, the rectangle data of various kinds of areas obtained as mentioned above is output from the output unit 104 together with the image data.

Figure 38:
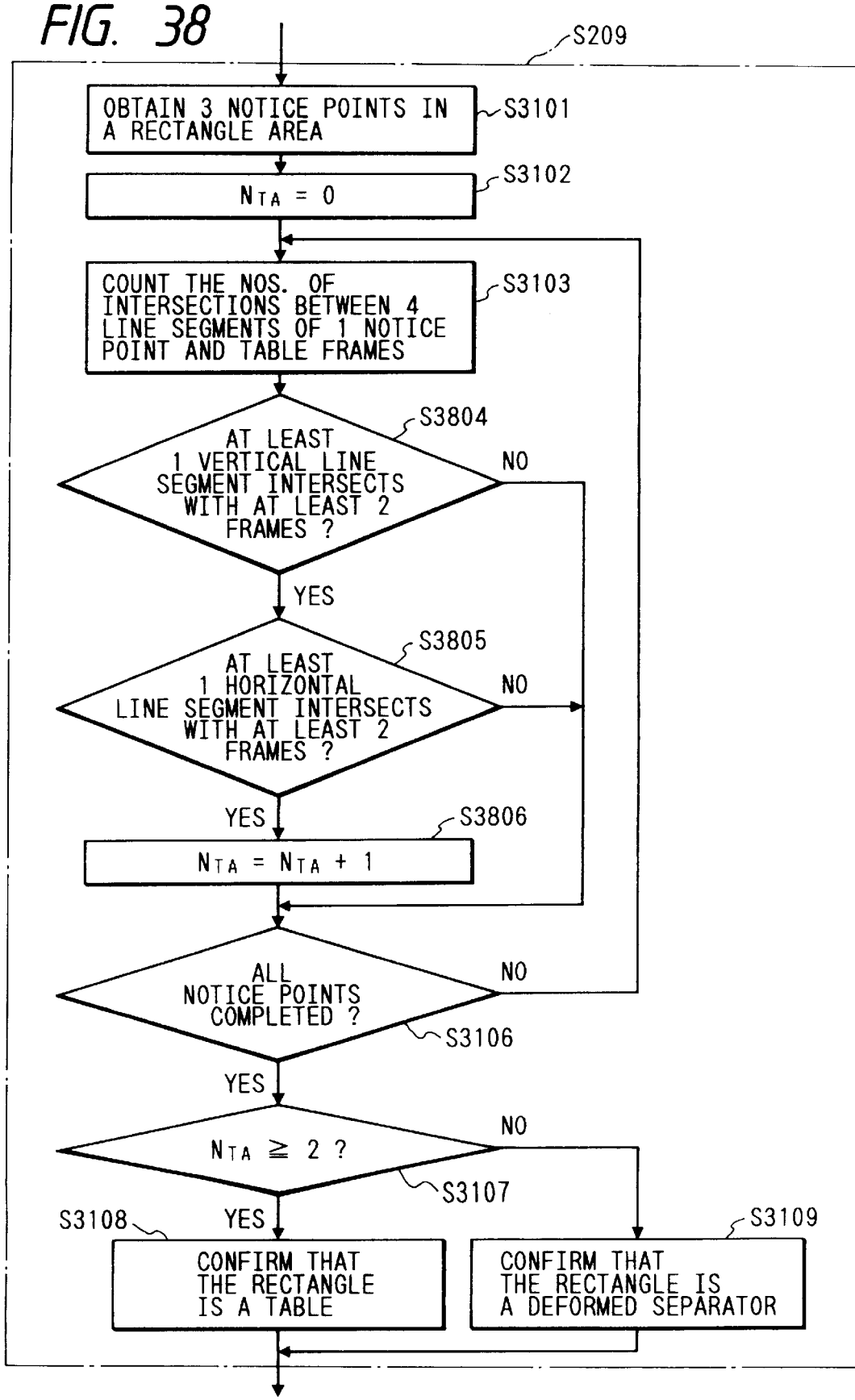
FIG. 38 is a flowchart showing an example of processes of the table area identifier.

FIG. 38 is a flowchart for explaining in detail an example in which a plurality of notice points are obtained in the rectangle area in the table area identifying process in step S209.

In the process in FIG. 38, processing steps similar to those in the flowchart of FIG. 31 in the embodiment 2 are designated by the same reference numerals and their descriptions are omitted here.

Explanation will now be made hereinbelow with respect to the case of a table with reference to FIG. 29 and the flowchart of FIG. 38.

In this process, it is now assumed that three arbitrary notice points are obtained in the rectangle area which was judged as a table and total 12 line segments are extended, namely, total four line segments are extended one by one in the upper, lower, left, and right directions every notice point, respectively. There is used table identifying means for identifying the rectangle area as a table in the case where two or more notice points such that at least one of the line segments extending in the upper and lower directions intersects with the table frame two or more times and at least one of the line segments extending in the left and right directions intersects with the table frame two or more times exist and for identifying the rectangle area as a deformed separator in the case other than the above case.

In step S3804, a check is made to see if at least one of the line segments extending in the upper and lower directions intersects with the table frame two or more times or not. Since both of the line segments extending in the upper and lower directions intersect with the table frame two or more times, step S1205 follows. If there is no line segment which intersects with the table frame two or more times, step S3807 follows.

In step S3805, a check is made to see if at least one of the line segments extending in the left and right directions intersects with the table frame two or more times or not. Since the line segment extending in the left direction intersects with the table frame two or more times, step S3806 follows. If there is no line segment which intersects with the table frame two or more times, step S3807 follows.

In step S3806, "1" is added to the number of table area identified notice points.

(the number of table area identified notice points)=0+1=1

In step S3807, a check is made to see if the processes have been performed for all of the notice points or not. Since the notice points 2905 and 2906 still remain, the processing routine is returned to step S3805. Processes similar to those for the notice point 2905 are also executed for the notice points 2905 and 2906. As will be obviously understood from FIG. 29, when the processes are finished for all of the notice points, (the number of table area identified notice points)=3

Since the processes about all of the notice points have been finished, step S3808 follows.

In step S3808, a check is made to see if (the number of table area identified notice points) is equal to or larger than 2 or not. Since it is equal to or larger than 2, step S3809 follows.

In step S3809, the rectangle area is identified as a table area and step S210 follows.

Explanation will now be made with respect to the case of a deformed separator.

In step S3804, a check is made to see if at least one of the line segments extending in the upper and lower directions intersects with the table frame two or more times or not. Since both of the line segments extending in the upper and lower directions don't intersect the table frame two or more times, step S3807 follows.

In step S3807, a check is made to see if the processes have been executed for all of the notice points or not. Since the notice points 3005 and 3006 still remain, the processing routine is returned to step S3803. Processes similar to those for the notice point 3004 are also executed to the notice points 3005 and 3006. As will be obviously understood from FIG. 30, when the processes are finished for all of the notice point, (the number of table area identified notice points)=0

Since the processes about all of the notice points have been finished, step S3808 follows.

In step S3808, a check is made to see if (the number of table area identified notice points) is equal to or larger than 2. Since it is not equal to or larger than 2, step S3810 follows.

In step S3810, the rectangle area is identified as a deformed separator area and step S210 follows.

Figure 39:
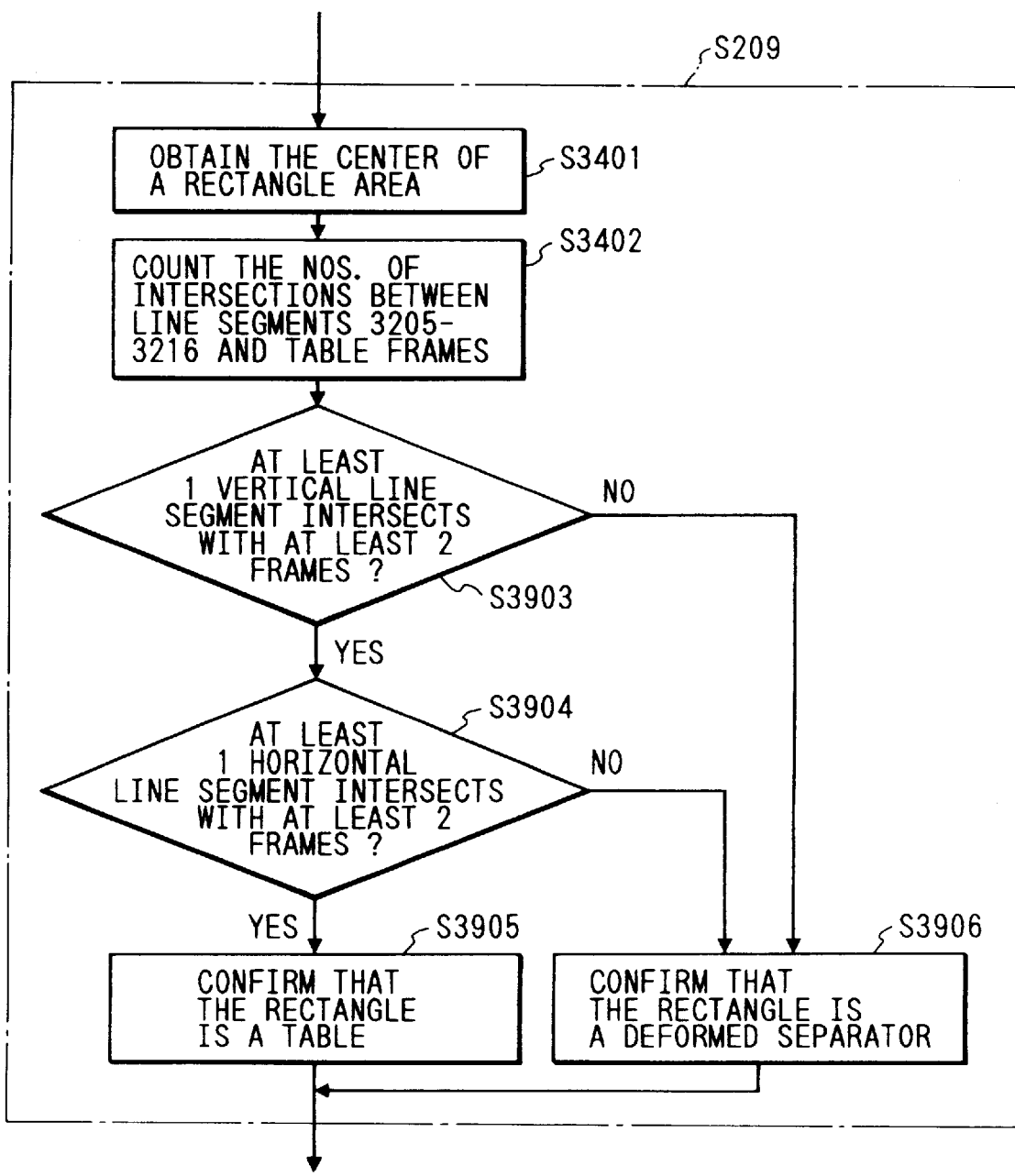
FIG. 39 is a flowchart showing an example of processes of the table area identifier.

FIG. 39 is a flowchart for explaining in detail an example in which a plurality of line segments are extended in the upper, lower, left, and right directions in the table area identifying process in step S209.

In the process in FIG. 39, processing steps similar to those in the flowchart of FIG. 34 in the embodiment 2 are designated by the same reference numerals and their descriptions are omitted here.

In step S3903, a check is made to see if there are line segments which intersect with the table frame two or more times among the line segments extending in the upper and lower directions or not. Since all of the line segments intersect with the table frame two or more times, step S3904 follows. If there is no line segment which intersects with the table frame two or more times, step S3906 follows.

In step S3904, a check is made to see if there are line segments which intersect with the table frame two or more times among the line segments extending in the left and right directions or not. Since the line segments 3211, 3212, 3213, and 3214 intersect with the table frame two or more times, respectively, step S3905 follows. If there is no line segment which intersects with the table frame two or more times, step S3906 follows.

In step S3905, the rectangle area is identified as a table area and step S210 follows.

Explanation will now be made with respect to the case of a deformed separator.

In step S3905, a check is made to see if there are line segments which intersect with the table frame two or more times among the line segments extending in the upper and lower directions or not. Since there is no line segment which intersects with the table frame two or more times, step S3906 follows.

In step S3906, the rectangle area is identified as a deformed separator area and step S210 follows.

Figure 40:
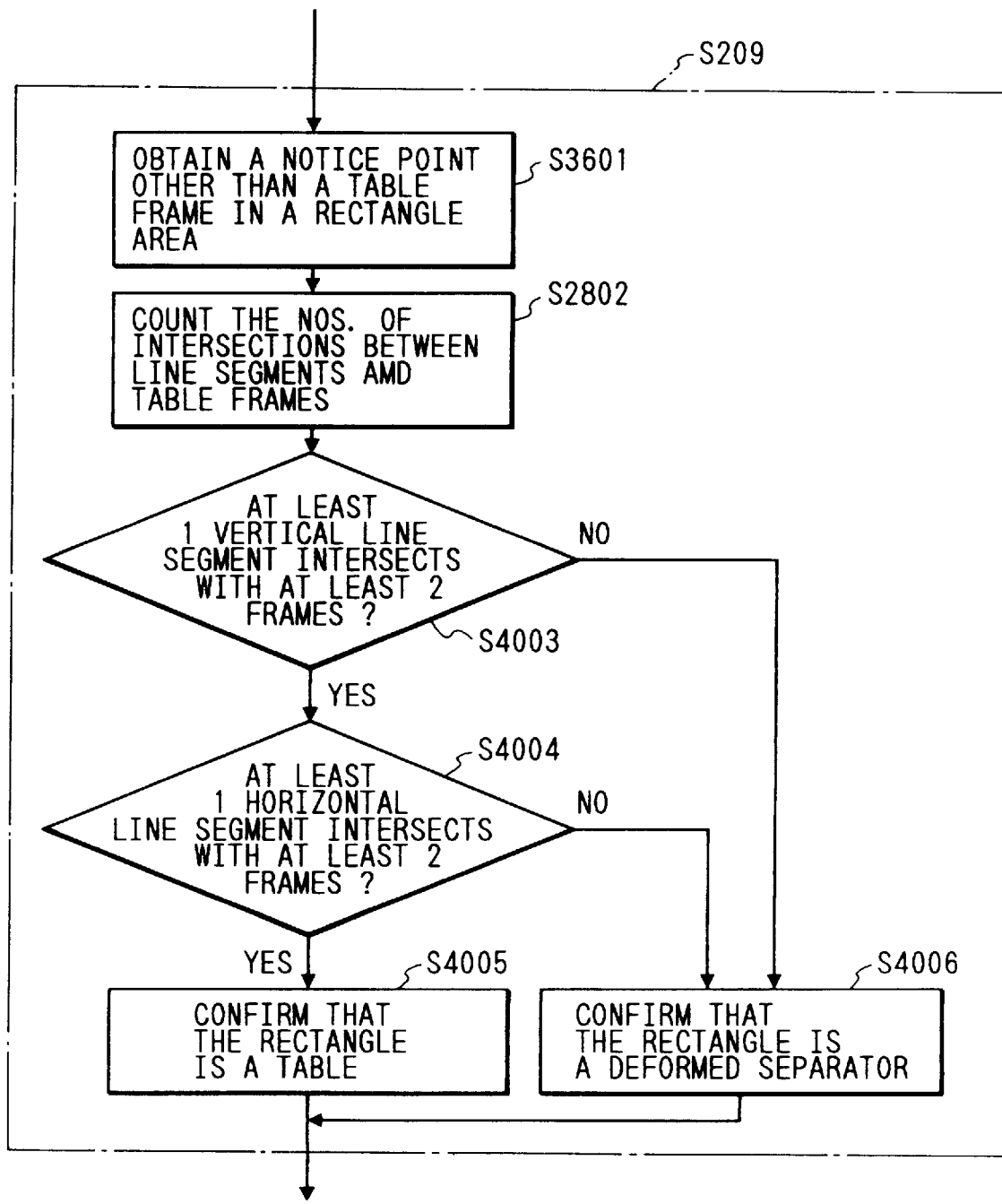
FIG. 40 is a flowchart showing an example of processes of the table area identifier.

FIG. 40 is a flowchart for explaining in detail the table area identifying process in step S209 and shows an example in which a notice point is obtained out of the table frame in the area rectangle (step S3601).

In the process of FIG. 40, processing steps similar to those shown in the flowchart of FIG. 28 of the embodiment 2 are designated by the same reference numerals and their descriptions are omitted here.

In the embodiment, it is assumed that one arbitrary notice point which doesn't belong to the table frame in the rectangle area which was judged as a table is obtained and total four line segments are extended one by one in the upper, lower, left, and right directions, respectively. There is used table identifying means for identifying the rectangle area as a table in the case where one or more notice points such that at least one of the line segments extending in the upper and lower directions intersects with the table frame two or more times and at least one of the line segments extending in the left and right directions intersects with the table frame two or more times exist and for identifying the rectangle area as a deformed separator in the case other than such a case.

In step S4003, a check is made to see if at least one of the line segments extending in the upper and lower directions intersects with the table frame two or more times or not. Since both of the line segments 3506 and 3507 intersect with the table frame two or more times, step S4004 follows. If there is no line segment which intersects with the table frame two or more times, step S4006 follows.

In step S4004, a check is made to see if at least one of the line segments extending in the left and right directions intersects with the table frame two or more times or not.

Since the line segments 3507 intersects with the table frame two or more times, step S4005 follows. If there is no line segment which intersects with the table frame two or more times, step S4006 follows.

In step S4005, the rectangle area is identified as a table area and step S210 follows.

In step S906, the rectangle area is identified as a deformed separator area and step S210 follows.

When the image is inputted in step S201, a check is made to see if the input image is a multi-value image or not. By converting the multi-value image into the binary image, the area dividing process can be performed even in the case where the input image is a multi-value image such as a color image or the like.

Upon inputting of the image in step S201, as the number of pixels of the input image is so large that a long processing time is needed, the processing time can be raised by executing the image thinning process for thinning out the image of m dots (in the vertical direction) ×n dots (in the horizontal direction) into one pixel.

In the detection of the separator or the like in step S203, the area attributes can be classified further in details by distinguishing the rectangle label by a difference between the vertical and horizontal directions of the separator, a difference between the threshold values of a figure, table, or the like when they are obtained, or the like.

When identifying the table area in step S209, the table area identifying process can be also performed without using a method whereby the number of line segments which are extended in the upper, lower, left, and right directions is equivalently distributed to the upper, lower, left, and right directions.

Upon identification of the table area in step S209, in the case where there are a plurality of notice points, the table area identifying process can be performed without using a method such that the number of line segments which are extended in the upper, lower, left, and right directions is equivalently distributed every notice point.

Upon final output in step S210, only the image data of the necessary area can be also output with reference to the rectangle data of various kinds of areas. The memory area can be further reduced and the processing time can be further reduced.

Embodiment 4

Figure 41:
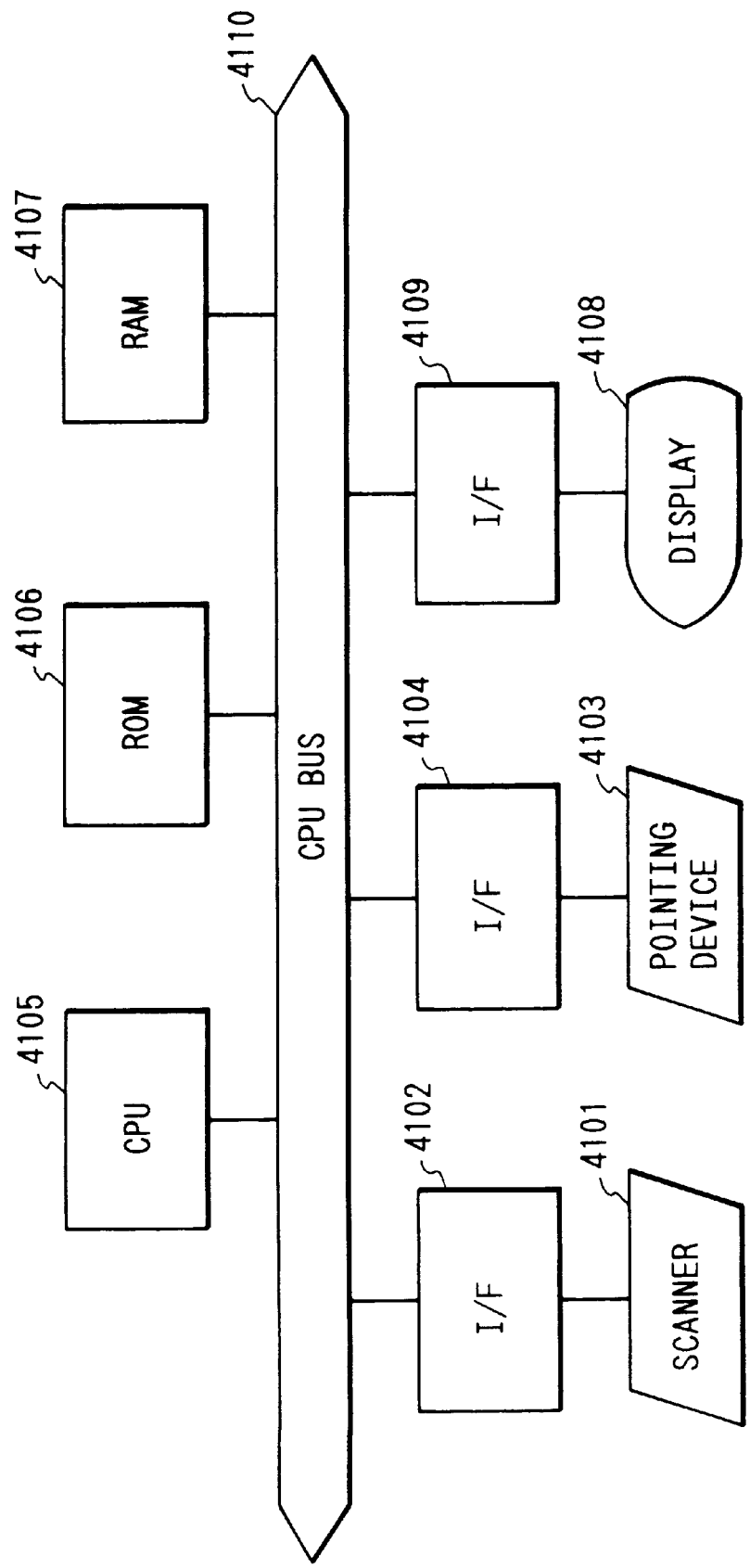
FIG. 41 is a block diagram showing a construction of an image processing apparatus for discriminating and obtaining the type-setting direction.

An embodiment of a process for judging the type-setting direction of a document from the image data of the inputted document and for alarming to the operator will now be described. FIG. 41 is a block diagram showing a construction of an image processing apparatus of the embodiment. In FIG. 41, reference numeral 4101 denotes a scanner for irradiating the light to the image original, for reading the reflected light, and for converting into the electric signal; 4102 a scanner interface circuit for converting the electric signal obtained by the scanner 4101 into the binary digital signal and for transmitting to another constructing element of the apparatus; 4103 a pointing device for inputting the coordinates on a window of the display; 4104 a pointing device interface circuit for transmitting the signal from the pointing device 4103 to another constructing element of the apparatus; 4105 a CPU for executing a control of the whole apparatus, a character extracting process, and a recognizing process in accordance with the programs stored in the ROM; 4106 an ROM to store a control program for processes which are executed by the CPU 4105 as shown in flowcharts, which will be explained hereinlater, various kinds of processing programs, a recognition dictionary, or the like; 4107 an RAM which is used as a work area for a process for developing the character image or a process for recognizing a character; 4108 a display for displaying the input image and the recognition result; 4109 a display interface circuit; and 4110 a CPU bus for connecting the constructing elements of the apparatus.

Figure 42:
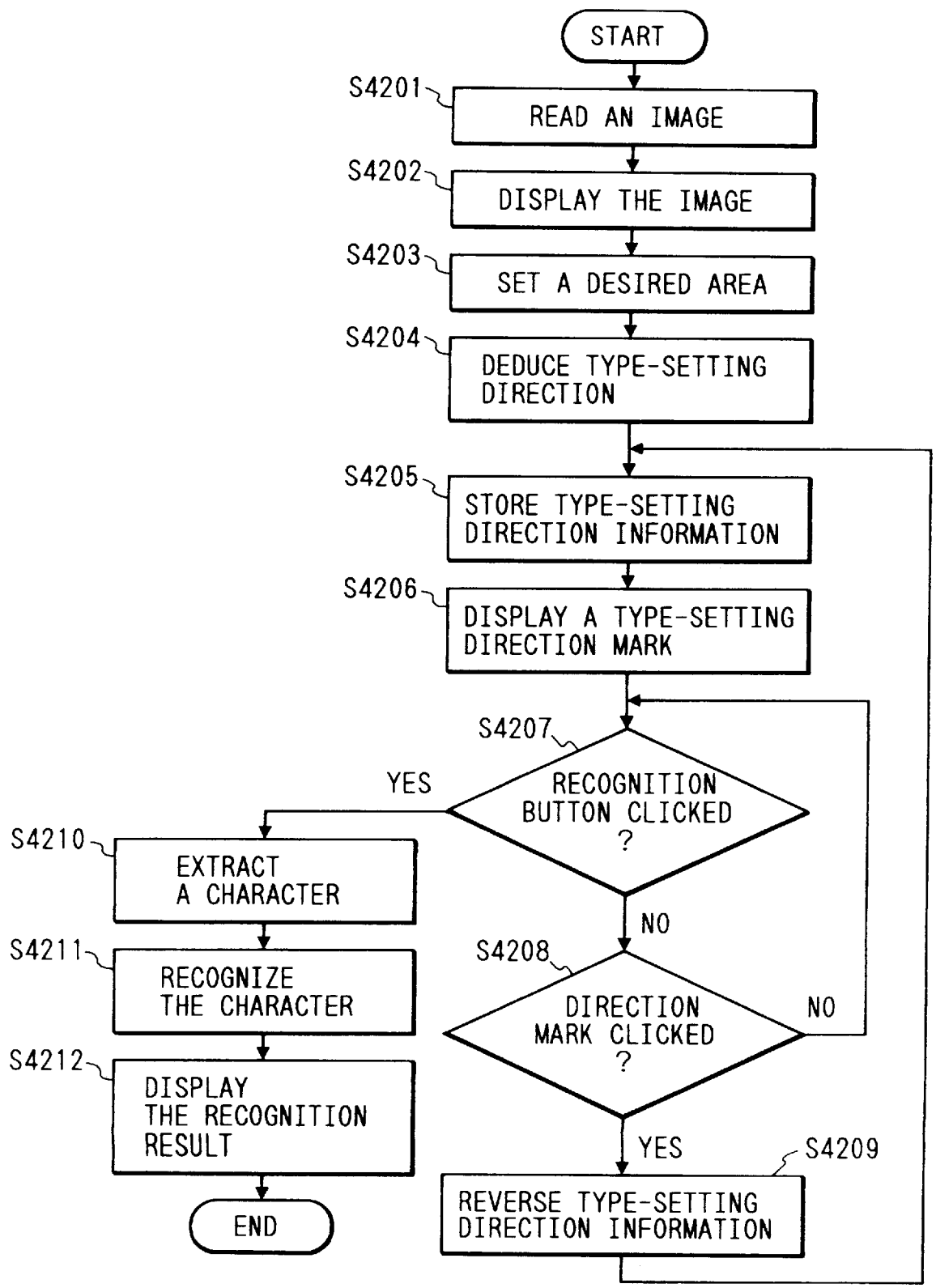
FIG. 42 is a flowchart showing a flow of a type-setting direction judging process.

FIG. 42 is a flowchart showing a flow of processes in the embodiment. In step S4201, the image is read out from the scanner 4101 and the image information is converted into the binary electric signal by the scanner interface circuit 4102. The read data is displayed on the display 4108 in step S4202. An area as a target to be recognized is set by the operator by using the pointing device 4103 in step S4203. Since the vertical type-setting document and the horizontal type-setting document exist as Japanese documents, it is necessary to determine the type-setting direction before the recognizing process is executed. In step S4204, the type-setting direction is deduced for the recognition target area by a method, which will be explained hereinlater, the type-setting direction information regarding whether the type-setting direction is the vertical type-setting direction or the horizontal type-setting direction is obtained, and the type-setting direction information is held in the RAM 4107 in step S4205. In step S4206, a type-setting direction mark 452 is displayed at the left lower corner of the target area on the display 4108 as shown in a display example of FIG. 45 in accordance with the type-setting direction information. The operator judges the deduction of the type-setting direction by the apparatus by seeing the mark 452. When the display content of the type-setting direction is correct, the operator clicks a recognition button by the pointing device 4103. When it is judged in step S4207 that the recognition button was clicked, step S4210 follows. The character extracting process for extracting the character image every character in step S4210. The recognizing process is executed in step S4211. The recognition result is displayed on the display in step S4212 and is edited or preserved in accordance with an instruction of the operator.

However, it is very difficult to deduce the type-setting direction in dependence on the input document and the correct deduction of the type-setting direction is not always performed. Therefore, when the type-setting direction is not correctly deduced, the operator clicks the type-setting direction mark on the display by using the pointing device 4103. Thus, the type-setting direction information is reversed in step S4209. The reversing process denotes that the horizontal type-setting document is changed to the vertical type-setting document or that the vertical type-setting document is changed to the horizontal type-setting direction. In accordance with the reversed type-setting direction information, the type-setting direction mark is again displayed in step S4209. After that, the processing routine is returned to step S4205 and processes are executed in a manner similar to those mentioned above after that.

A method of deducing the type-setting direction which is executed in step S4204 in the embodiment will now be described with reference to FIG. 43. For the image data, an x axis is set in the horizontal direction and the projection component of the black pixel to the x axis assumes P(x). Similarly, a y axis is set into the vertical direction and the projection component to the y axis assumes P(y). A shadow portion in FIG. 43 shows the size of projection component.

A distribution of each of P(x) and P(y) is calculated by the following equation.

$$Sx = 1/n \Sigma (P(x) - \bar{P})^2$$

where, $\bar{P}$ denotes an average of P(x) of this interval and the sum of all of the projection components in this interval is get and indicates the number of data in this interval.

Similarly, a distribution of P(y) is also calculated.

$$Sy = 1/m \Sigma (P(y) - \bar{P})^2$$

where, $\bar{P}$ denotes the average of P(y) in this interval and m indicates the number of data in this interval.

The type-setting direction is deduced by using Sx and Sy. Namely, since the distribution of the projection component is large for the direction along the type-setting direction, when $$Sx > Sy$$

it is deduced that the type-setting direction is the horizontal direction. Unless otherwise, it is deduced that the type-setting direction is the vertical direction.

Figure 44:
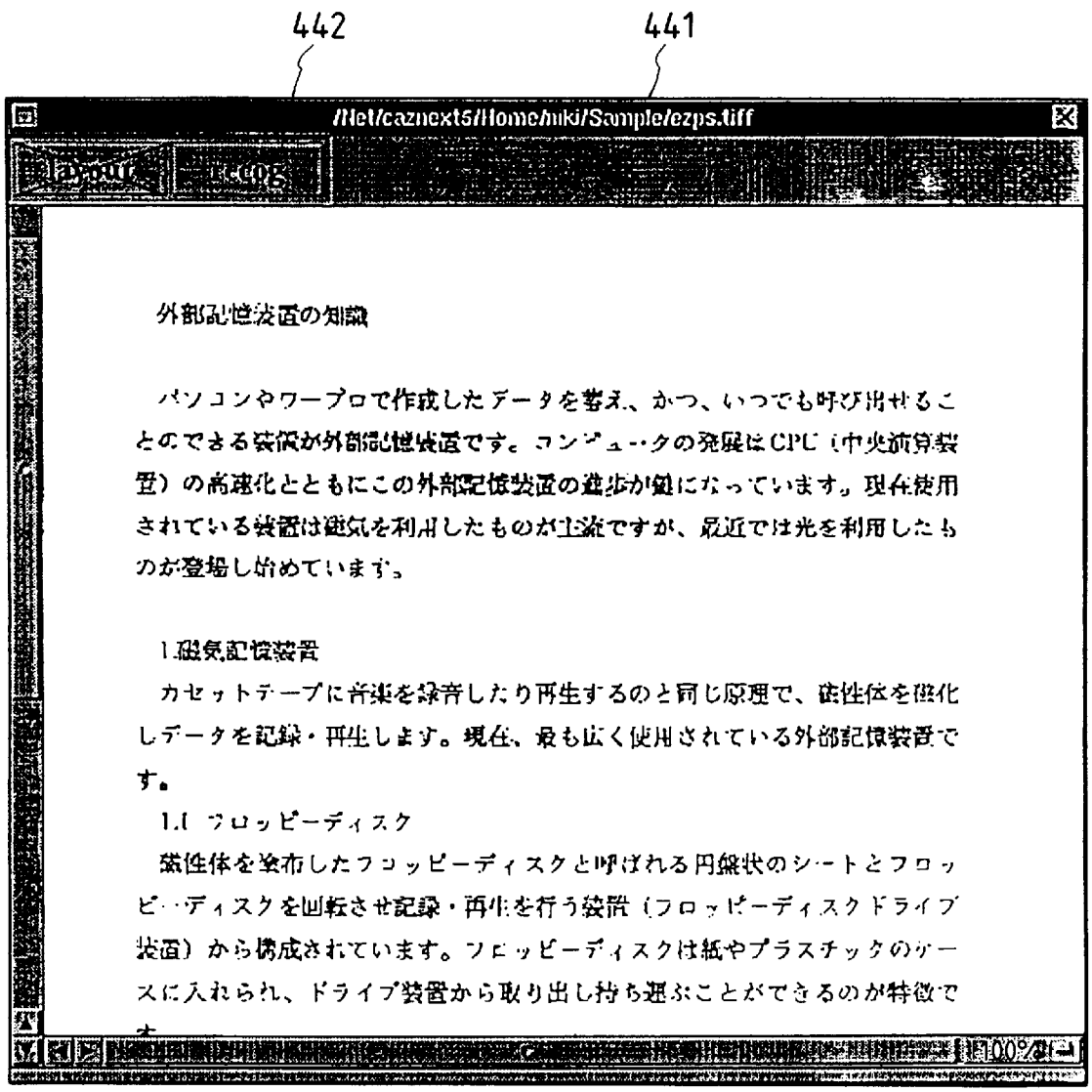
FIG. 44 is a diagram showing an example of display of image data onto a display.
Figure 45:
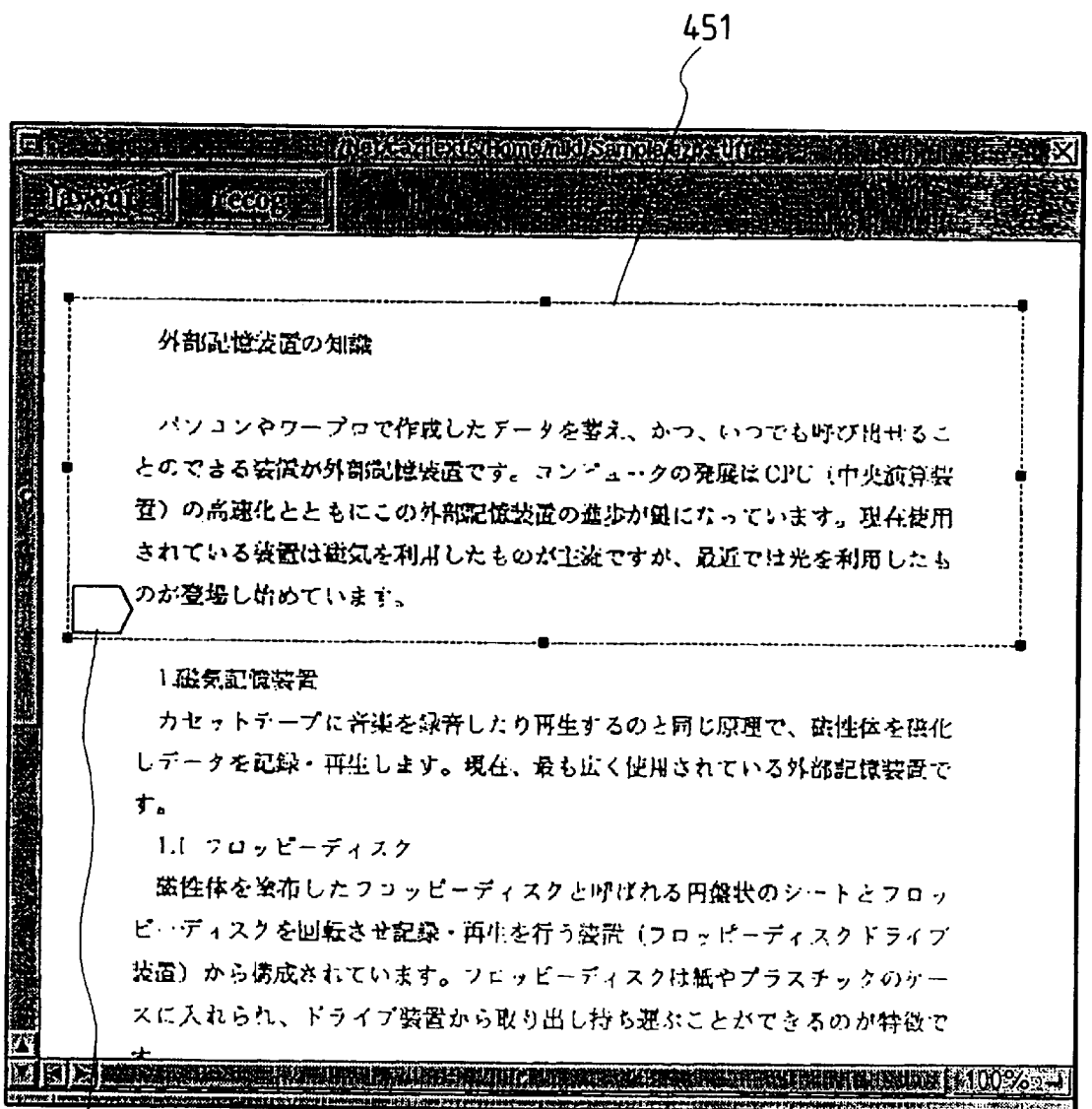
FIG. 45 is a diagram showing a display example of a type-setting direction mark.
Figure 46:
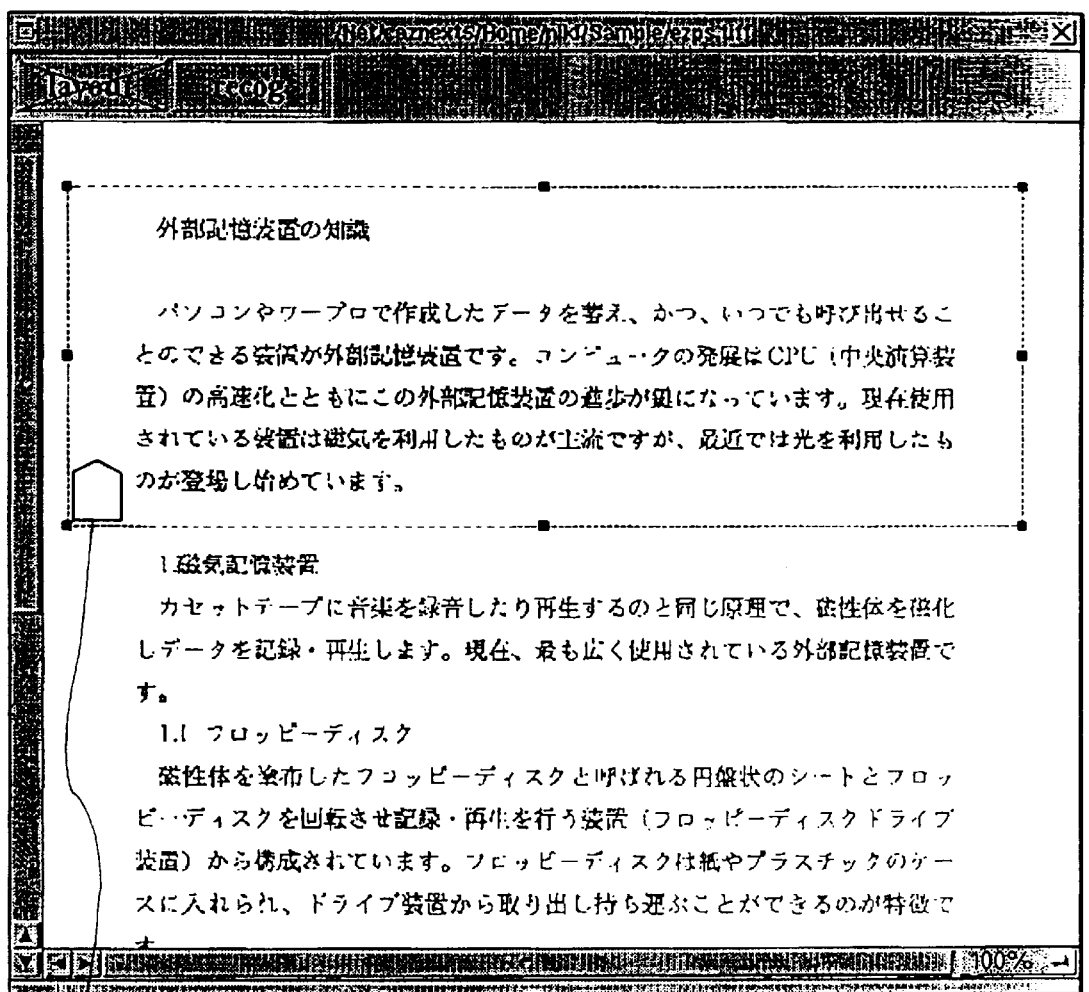
FIG. 46 is a diagram showing a display example of a type-setting direction mark.
Figure 47:
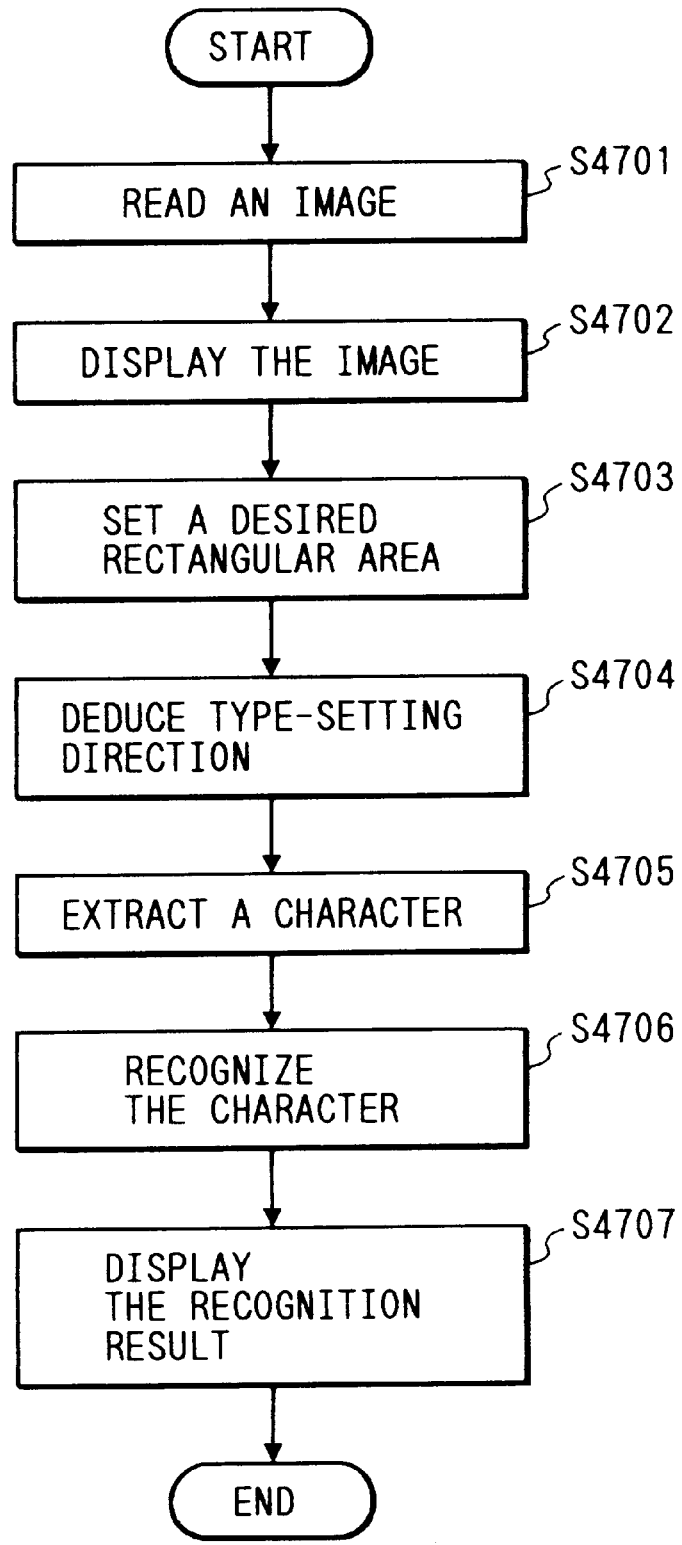
FIG. 47 is a flowchart for a procedure to execute image processes by deciding the type-setting direction in a conventional apparatus.

FIGS. 44 to 46 show display examples of the image data and type-setting direction mark. FIG. 44 shows the example in the case where the image data is displayed on the display 4108. Reference numeral 441 denotes a window to display the image. "recog" 442 indicates a recognition button to instruct the execution of the recognition. FIG. 45 is a diagram showing a state in which a recognition target area 451 has been set by the pointing device 4103. When the recognition target area 451 is set, the type-setting direction is soon deduced and the result of the deduction is shown by the type-setting direction mark 452. The mark 452 indicates the horizontal type-setting. Reference numeral 461 in FIG. 46 denotes a type-setting direction mark. In this case, however, the deduction of the type-setting direction is wrong.

The invention is effective without limiting the deducing method of the type-setting direction. The invention is not limited by the design, display position, color, or the like of the type-setting direction mark. Further, as means for reversing the type-setting direction information, it is possible to use a method whereby a push button of a mouse is clicked twice, the mark is grasped (dragged) and rotated, or the like.

What is claimed is:

1. An image processing method comprising the steps of:
   inputting image information;
   dividing the input image information into a plurality of text areas;
   extending a ray from a point within a specific one of the divided text areas to a different one of the divided text areas spaced apart from the specific area and detecting connection information between the specific text area and the different text area; and
   discriminating whether the specific text area and the different text area are included in a same group in accordance with the detected connection information,
   wherein the connection information corresponds to a relative position of the specific text area and the different text area.

2. A method according to claim 1, wherein the image information comprises dot information.

3. An image processing method comprising the steps of:
   inputting image information;
   dividing the input image information into a plurality of areas each spaced apart from one another and including a plurality of characters;
   determining a headline area and a body area from the divided areas;

extending a ray from a point within the determined headline area and detecting intersection information between the ray and the determined body area; and judging an order in which the characters in the headline area and in the body area are to be read in accordance with the detected intersection information, wherein the intersection information corresponds to a relative position of the headline area and the body area.

4. A method according to claim 3, wherein the image information is dot information.

5. An image processing apparatus comprising:

input means for inputting image information;

area dividing means for dividing the input image information into a plurality of text areas;

detecting means for extending a ray from a point within a specific one of the divided text areas to a different one of the divided text areas spaced apart from the specific area and for detecting connection information between the specific text area and the different text area; and discriminating means for discriminating whether the specific text area and the different text area are included in a same group in accordance with the detected connection information, wherein the connection information comprises a relative position of the specific area and the different text area.

6. An apparatus according to claim 5, wherein the image information comprises dot information.

7. An image processing apparatus comprising:

input means for inputting image information;

dividing means for dividing the input image information into a plurality of areas each spaced apart from one another and including a plurality of characters;

determining means for determining a headline area and a body area from the divided text areas;

detecting means for extending a ray from a point within the determined headline area and for detecting intersection information between the ray and the determined body area; and judging means for judging an order in which characters in the headline area and in the body area are to be read in accordance with the detected intersection information, wherein the intersection information corresponds to a relative position between the headline area and the body area.

8. An apparatus according to claim 7, wherein the image information is dot information.

9. A computer-useable medium storing computer-useable instructions for causing a processor to perform image processing, the instructions comprising instructions for:

causing the processor to input image information;

causing the processor to divide the input image information into a plurality of text areas;

causing the processor to extend a ray from a point within a specific one of the divided text areas to a different one of the divided text areas spaced apart from the specific area and detecting connection information between the specific text area and the different text area; and causing the processor to discriminate whether the specific text area and the different text area are included in a same group in accordance with the detected connection information, wherein the connection information corresponds to a relative position of the specific area and the different text area.

10. A computer-useable medium according to claim 9, wherein the image information comprises dot information.

11. A computer-useable medium storing computer-useable instructions for causing a processor to perform image processing, the instructions comprising instructions for:

causing the processor to input image information;

causing the processor to divide the input image information into a plurality of areas each spaced apart from one another and including a plurality of characters;

causing the processor to determine a headline area and a body area from the divided areas;

causing the processor to extend a ray from a point within the determined headline area and detect intersection information between the ray and the determined body area; and causing the processor to judge an order in which the characters in the headline area and in the body area are to be read in accordance with the detected intersection information, wherein the intersection information corresponds to a relative position of the headline area and the body area.

* * * * *